United States Patent
Kim et al.

(10) Patent No.: US 10,045,228 B2
(45) Date of Patent: Aug. 7, 2018

(54) METHOD AND APPARATUS, IN MOBILE COMMUNICATION SYSTEM, FOR EFFECTIVELY PROVIDING CONFIGURATION INFORMATION ABOUT SMALL CELL THAT HAS SMALL CELL SERVICE REGION

(71) Applicant: Samsung Electronics Co., Ltd., Gyeonggi-do (KR)

(72) Inventors: Sangbum Kim, Gyeonggi-do (KR); Himke Van DerVelde, Middlesex (GB); Soenghun Kim, Gyeonggi-do (KR); Jaehyuk Jang, Gyeonggi-do (KR); Kyeongin Jeong, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/872,047

(22) Filed: Sep. 30, 2015

(65) Prior Publication Data

US 2016/0029362 A1    Jan. 28, 2016

Related U.S. Application Data

(63) Continuation of application No. 14/781,207, filed as application No. PCT/KR2014/007406 on Aug. 8, 2014.

(30) Foreign Application Priority Data

Aug. 9, 2013  (KR) .......................... 10-2013-0094735
Sep. 27, 2013  (KR) .......................... 10-2013-0115568
Nov. 8, 2013  (KR) .......................... 10-2013-0135648

(51) Int. Cl.
*H04W 16/32*    (2009.01)
*H04L 5/00*    (2006.01)
(Continued)

(52) U.S. Cl.
CPC .......... *H04W 16/32* (2013.01); *H04L 5/0048* (2013.01); *H04W 24/02* (2013.01);
(Continued)

(58) Field of Classification Search
None
See application file for complete search history.

(56) References Cited

U.S. PATENT DOCUMENTS 5,050,777 A    9/1991    Buchser
6,109,476 A    8/2000    Thompson et al.
(Continued)

FOREIGN PATENT DOCUMENTS

CN    102484875 A    5/2012
KR    10-2012-0042923 A    5/2012
(Continued)

OTHER PUBLICATIONS

International Search Report dated Dec. 1, 2014 in connection with International Application No. PCT/KR2014/007406; 15 pages.
(Continued)

*Primary Examiner* — Dang Ton
*Assistant Examiner* — Faiyazkhan Ghafoerkhan

(57) ABSTRACT

A method and an apparatus, in a mobile communication system, for effectively providing configuration information about a small cell that has a small cell service region are provided. The method for transmitting reconfiguration information of a small cell base station in a mobile communication system includes: when deciding to reconfigure a small cell, obtaining the latest macro cell configuration information from a macro cell base station; generating reconfiguration information about the small cell on the basis of the obtained macro cell configuration information; and transmitting, to the macro cell base station, the regenerated reconfiguration information so that the macro cell base
(Continued)

station can transmit the reconfiguration information to User Equipment (UE).

14 Claims, 17 Drawing Sheets

(51) Int. Cl.
*H04W 24/02* (2009.01)
*H04W 74/08* (2009.01)
*H04W 92/20* (2009.01)
*H04W 84/04* (2009.01)

(52) U.S. Cl.
CPC ...... *H04W 74/0833* (2013.01); *H04W 84/045* (2013.01); *H04W 92/20* (2013.01)

(56) References Cited

U.S. PATENT DOCUMENTS

| | | | |
|---|---|---|---|
| 8,160,591 | B2 | 4/2012 | Xu et al. |
| 8,526,362 | B2 | 9/2013 | Beattie, Jr. et al. |
| 8,934,885 | B2 | 1/2015 | Yoo et al. |
| 9,212,841 | B2 | 12/2015 | Kim et al. |
| 9,671,147 | B2 | 6/2017 | Jeong et al. |
| 2006/0090496 | A1 | 5/2006 | Adamski et al. |
| 2008/0053138 | A1 | 3/2008 | Ryu et al. |
| 2011/0034174 | A1* | 2/2011 | Xu .................... H04W 72/0426 455/447 |
| 2011/0081897 | A1* | 4/2011 | Beattie, Jr. ............ H04W 24/02 455/418 |
| 2012/0172046 | A1* | 7/2012 | Xu .................... H04W 72/0426 455/443 |
| 2012/0182896 | A1 | 7/2012 | Jang et al. |
| 2013/0130699 | A1* | 5/2013 | Xu .................... H04W 72/0426 455/443 |
| 2013/0157643 | A1* | 6/2013 | Yoo ....................... H04W 24/02 455/418 |
| 2013/0286883 | A1 | 10/2013 | Kim et al. |
| 2013/0305763 | A1 | 11/2013 | Nuss |
| 2013/0343297 | A1* | 12/2013 | Dinan ................. H04W 72/042 370/329 |
| 2014/0243002 | A1* | 8/2014 | Muruganathan .. H04W 72/0426 455/450 |
| 2015/0029955 | A1* | 1/2015 | Heo ....................... H04W 76/02 370/329 |
| 2016/0143027 | A1* | 5/2016 | Kim .................. H04W 72/0426 370/329 |
| 2016/0150502 | A1* | 5/2016 | Sebire ................... H04W 72/04 455/450 |

FOREIGN PATENT DOCUMENTS

| | | |
|---|---|---|
| KR | 10-2012-0083863 A | 7/2012 |
| KR | 10-2013-0068049 A | 6/2013 |
| KR | 20130081136 A | 7/2013 |
| KR | 20140139282 A | 12/2014 |
| WO | 2011016932 A | 2/2011 |

OTHER PUBLICATIONS

Written Opinion of the International Searching Authority dated Dec. 1, 2014 in connection with International Application No. PCT/KR2014/007406; 6 pages.

ZTE; "Mechanisms for Interference Avoidance and Coordination in Small Cell Scenarios"; R1-130135; 3GPP TSG RAN WG1 Mtg. #72; St. Julian's, Malta; Jan. 28-Feb. 1, 2013; 7 pages.

European Search Report dated Apr. 24, 2017 in connection with European Patent Application No. 16 20 4171.

Ericsson et al.; "Impact of small cell enhancements to RRC functions"; 3GPP TSG-RAN WG2 #82; R2-131672; Fukuoka, Japan; May 20-24, 2013; 6 pages.

Foreign Communication from Related Counterpart Application; Chinese Patent Application No. 201480024784.X; The First Office Action dated Feb. 2, 2018; 15 pages.

* cited by examiner

METHOD AND APPARATUS, IN MOBILE COMMUNICATION SYSTEM, FOR EFFECTIVELY PROVIDING CONFIGURATION INFORMATION ABOUT SMALL CELL THAT HAS SMALL CELL SERVICE REGION

The present application is a continuation of U.S. patent application Ser. No. 14/781,207, filed Sep. 29, 2015, which claims priority under 35 U.S.C. § 365 to International Patent Application No. PCT/KR2014/007406 filed Aug. 8, 2014, entitled "METHOD AND APPARATUS, IN MOBILE COMMUNICATION SYSTEM, FOR EFFECTIVELY PROVIDING CONFIGURATION INFORMATION ABOUT SMALL CELL THAT HAS SMALL CELL SERVICE REGION", and, though International Patent Application No. PCT/KR2014/007406, to Korean Patent Application No. 10-2013-0094735 filed Aug. 9, 2013, Korean Patent Application No. 10-2013-0115568 filed Sep. 27, 2013, and Korean Patent Application No. 10-2013-0135648 filed Nov. 8, 2013, all of which are incorporated herein by reference into the present disclosure as if fully set forth herein

TECHNICAL FIELD

The present invention relates to a method and an apparatus for effectively providing configuration information about a small cell that has a small cell service region in a mobile communication system.

BACKGROUND ART

In general, a mobile communication system has been developed for the purpose of providing communications while securing user's mobility. With the rapid progress of technology, such a mobile communication system can now provide not only voice communications but also high-speed data communication services. Recently, as one of is the next-generation of mobile communication systems, standardization of Long Term Evolution-Advanced (LTE-A) in 3GPP is currently underway. Setting a goal of standardization completion in the latter half of 2010, LTE-A has been developed as a technology to implement high-speed packet-based communication having a higher data rate than the data rate that is currently provided.

With the evolution of the 3GPP standard, a scheme to easily optimize a wireless network is under discussion in addition to a scheme to heighten the communication speed. In a mobile communication system, a cell having a small-sized service region has been frequently used to increase the capacity and to solve for the shaded region. Due to the small-sized service region, many problems, such as frequent handover failures, have occurred in supporting mobility. Nevertheless, application of system variables or development of an operating mechanism, that is suitable for the small-sized service region, has not been prepared in detail.

DISCLOSURE OF INVENTION

Technical Problem

The present invention has been made in order to solve the above problems, and an aspect of the present invention provides a method and an apparatus for effectively providing configuration information about a small cell that has a small cell service region in a mobile communication system.

Solution to Problem

In one aspect of the present invention, a method for transmitting reconfiguration information of a small cell base station in a mobile communication system includes: when deciding to reconfigure a small cell, obtaining the latest macro cell configuration information from a macro cell base station; generating reconfiguration information about the small cell on the basis of the obtained macro cell configuration information; and transmitting, to the macro cell base station, the regenerated reconfiguration information so that the macro cell base station can transmit the reconfiguration information to User Equipment (UE).

In another aspect of the present invention, a small cell base station that transmits reconfiguration information in a mobile communication system includes: a transceiver unit transmitting and receiving signals with a base station or User Equipment (UE); and a control unit operating, when deciding to reconfigure a small cell, to obtain the latest macro cell configuration information from a macro cell base station, to generate reconfiguration information about the small cell on the basis of the obtained macro cell configuration information, and to transmit, to the macro cell base station, the regenerated reconfiguration information so that the macro cell base station can transmit the reconfiguration information to the UE.

Advantageous Effects of Invention

In accordance with the present invention, the small cell base station can effectively transmit the generated reconfiguration information about the small cell to the UE.

MODE FOR THE INVENTION

Figure 1:
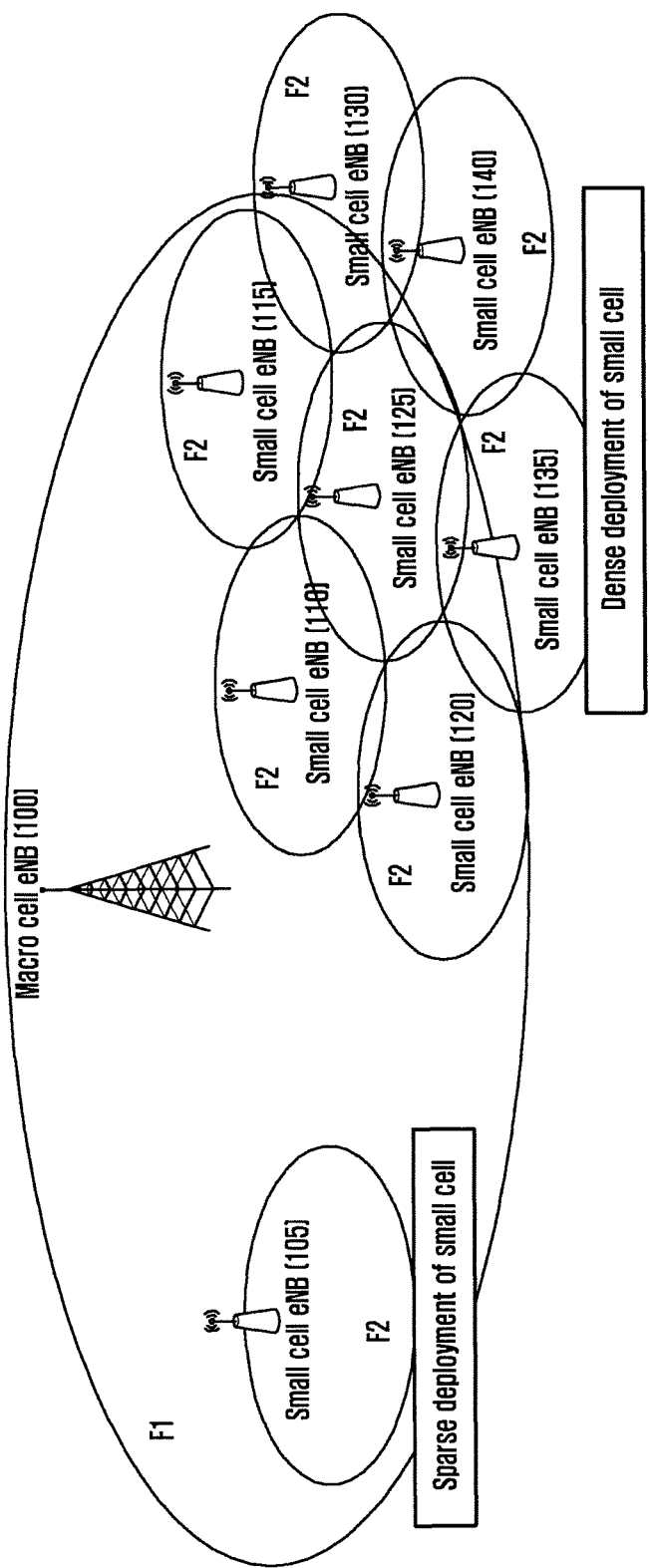
FIG. 1 is a diagram explaining a scheme for arranging small cells.

Hereinafter, preferred embodiments of the present invention will be described in detail with reference to the accompanying drawings. In the accompanying drawings, the same reference numerals are used for the same constituent elements. Further, detailed description of well-known functions or constructions incorporated herein may be omitted to avoid obscuring the subject matter of the present invention.

The present invention to be described hereinafter relates to a method and an apparatus for effectively providing configuration information about a small cell that has a small cell service region in a mobile communication system. Prior to the description of the present invention, arrangement of small cells having small cell service regions will be described. In the following description of the present invention, a cell having a small cell service region is commonly called "small cell".

FIG. 1 is a diagram explaining a small cell arrangement method.

First arrangement method is to arrange small cells 105 sparsely (at relatively long intervals) in a service region of a macro cell 100. Such arrangement is useful to cover a hot spot region where a large amount of traffic occurs concentrically or a service shadow region. Further, depending on whether the small cell use a frequency band that is equal to or different from that of the macro cell, intra-frequency or inter-frequency handover (HO) occurs when User Equipment (UE) moves from the macro cell to the small cell and to vice versa.

Further, another arrangement method is to densely arrange a plurality of small cells 110 to 140 that are adjacent to one another. This method is useful when a large amount of traffic occurs in somewhat wide region.

The small cells may be located within a service region of the macro cell, and since even only the small cells can cover the whole service region, the small cells may not be located in the service region of the macro cell. All the small cells may use the same frequency band, and in this case, if the UE moves between the small cells, the intra-frequency HO occurs. In the two arrangement schemes as described above, the UE may be simultaneously connected to the macro cell and the small cell to receive data. This is called dual connectivity. In particular, depending on whether a Radio Resource Control (RRC) message can be transmitted from a location (node, e.g., macro cell or small cell) for processing the RRC message or from both the macro cell and the small cell, different small cell reconfiguration processes may be performed. Here, the reconfiguration means that a base station changes an operation, transmission configuration, and channel configuration of specific UE, and for this, the base station provides reconfiguration information to the UE using the RRC message.

In first two embodiments of the present invention, a small cell reconfiguration process according to a location for processing the RRC message is proposed. In the last embodiment, a signaling process for addition, to a small cell, correction, and release of a Secondary Cell (SCell) is proposed. Here, the SCell means a cell that is used to provide radio resources to UE in an additional frequency band. The above-described wordings are commonly used in carrier aggregation in LTE-A standard documents.

<Embodiment 1>

In embodiment 1, an RRC message for reconfiguring a small cell is made through an RRC. Further, the generated RRC message is transferred to UE through a macro cell base station.

Figure 2:
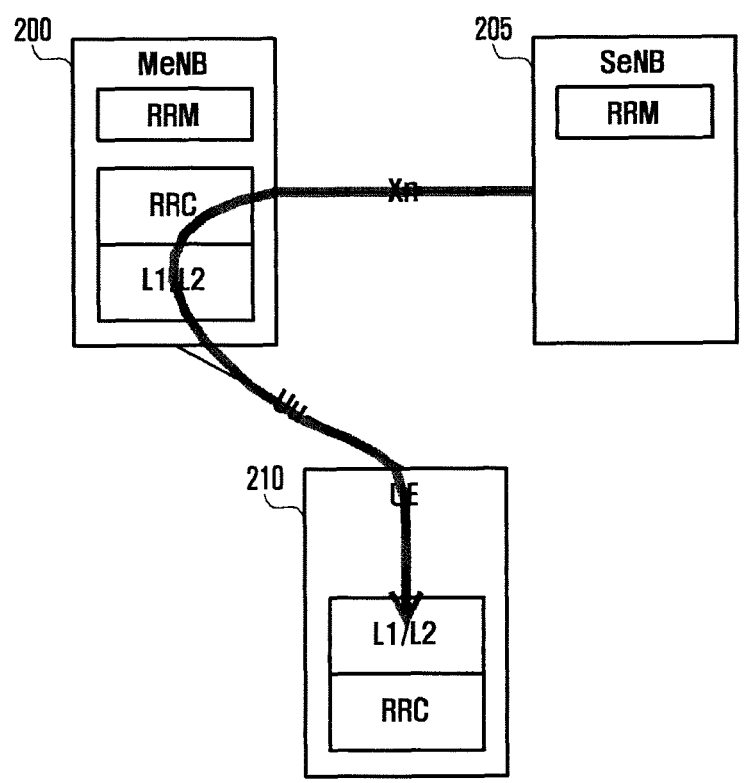
FIG. 2 is a conceptual diagram explaining small cell reconfiguration proposed in embodiment 1.

FIG. 2 is a conceptual diagram explaining small cell reconfiguration proposed in embodiment 1.

A small cell base station 205 may perform limited functions of Radio Resource is Management (RRM). For example, inherent functions of the RRM may be Radio Bearer Control (RBC), Radio Admission Control (RAC), Connection Mobility Control (CMC), Dynamic Resource control (DRA), and Inter-Cell Interference Coordination (ICIC), and among them, the RBC and RAC functions can be performed through the RRM that is located in a small cell. The RBC takes charge of establishment, maintenance, and release of a radio barrier, and RAC takes charge of approval and refusal of an establishment request for a new radio barrier.

In the macro cell base station 200, not only the RRM but also an RRC and L1/2 layers exist. If reconfiguration is required, the small cell base station requests this from the macro cell base station. In this case, the small cell base station transfers information that is required when the macro cell base station generates a related RRC message to the macro cell base station. The macro cell base station generates the RRC message of the small cell for the reconfiguration, and then transmits the generated RRC message to the UE 210. Accordingly, according to this embodiment, the RRC is located only in the macro cell, and an RRC that forms a pair with the RRC in the macro cell exists even in the UE.

Figure 3:
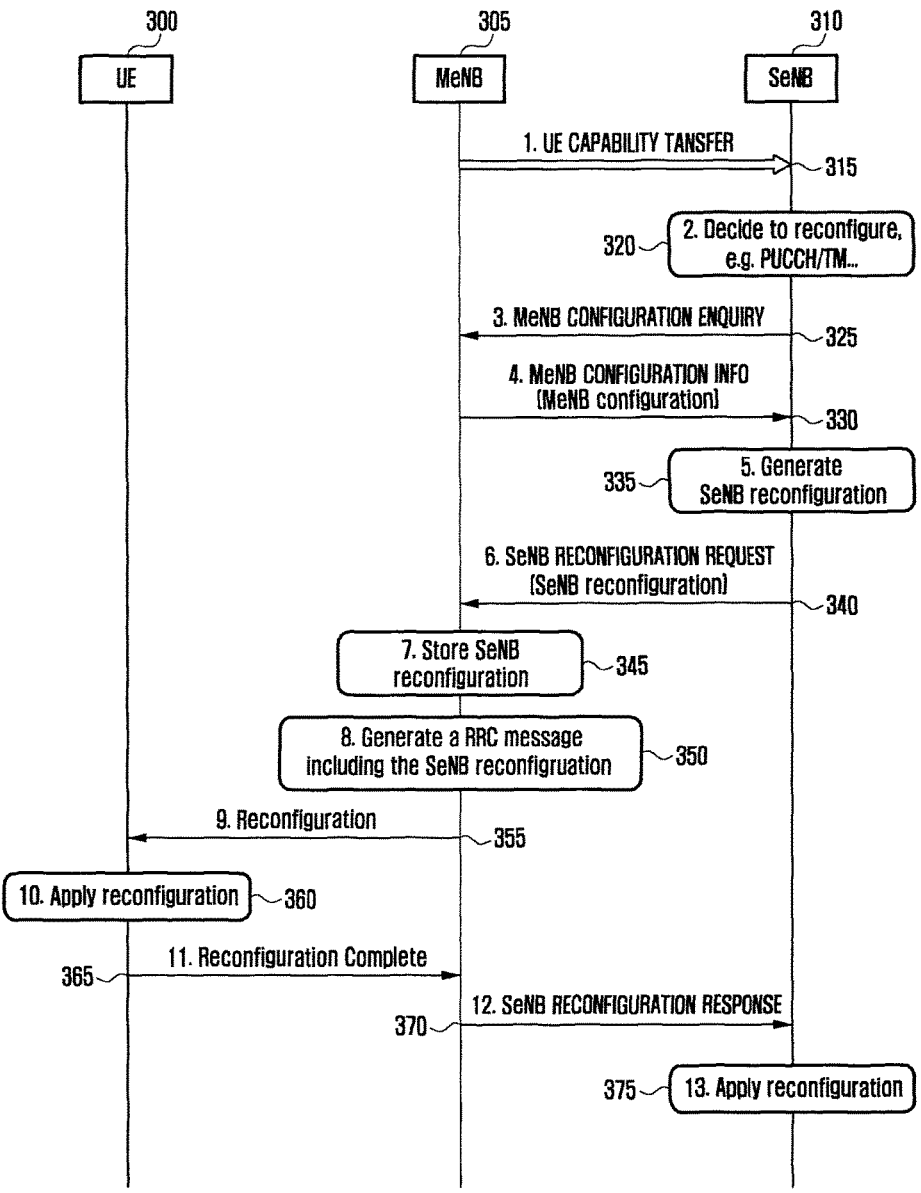
FIG. 3 is an operational flowchart explaining a small cell reconfiguration process proposed in embodiment 1.

FIG. 3 is an operational flowchart explaining a small cell reconfiguration process proposed in embodiment 1.

At step 315, a macro cell 305 provides, in advance, capability information of UE to a small cell 310 at a specific time. As an example, the capability information of the UE may be band combination information. The band combination information means combination information of a frequency band that the UE can support. The specific time may be time when the small cell is provided to the UE as one serving cell.

At step 320, the small cell decides reconfiguration. For example, the reconfiguration may be decided to change PUCCH or a Transmission Mode (TM).

In order for the small cell to generate reconfiguration information, it is necessary for the small cell to know configuration information of the macro cell in advance. This is because the reconfiguration of the small cell should not exceed the capability of the UE. The present invention is related to a method in which the small cell obtains the configuration information of the macro cell, and is featured to adopt at least one of two methods below.

1) A method for requesting and obtaining the latest macro cell configuration information from the macro cell base station whenever the small cell base station wants the reconfiguration 2) A method in which the macro cell base station provides the reconfiguration information to the small cell base station in the case where the reconfiguration of the macro cell that is judged to exert an influence on the small cell is performed In the drawing, the first one of the two methods as described above is illustrated.

At step 325, the small cell base station request the latest macro cell configuration information from the macro cell base station. At step 330, the macro cell base station provides the macro cell configuration information to the small cell base station. The macro cell configuration information may include the followings.

Number of serving cells: the number of serving cells that are in use in a macro cell DL bandwidth: downlink frequency bandwidth information of each serving cell of a macro cell AntennaInfoCommon: antenna information of each serving cell of a macro cell Mbsfn-subframeConfigList: Broadcasting Channel (MBSFN) subframe configuration information of each serving cell of a macro cell Phich-Config: PHICH channel configuration information of each serving cell of a macro cell Pdsch-ConfigCommon: PDSCH channel configuration information of each serving sell of a macro cell Tdd-Config: TDD configuration information of each serving cell of a macro cell (if the serving cell is of a TDD type)

Ul-CarrierFreq: uplink center frequency information of each serving cell of a macro cell Ul-Bandwidth: uplink frequency bandwidth information of each serving cell of a macro cell additionalSpectrumEmissionSCell: spectrum emission information of each serving cell of a macro cell P-Max: UE transmission power information uplinkPowerControlCommonSCell: uplink control channel configuration information of each serving cell of a macro cell sounding RS-UL-ConfigCommon: sounding reference signal configuration information of each serving cell of a macro cell Ul-CyclicPrefixLength: uplink cyclic prefix length information Prach-ConfigSCell: PRACH channel configuration information of each serving cell of a macro cell Pusch-ConfigCommon: PUSCH configuration information of each serving cell of a macro cell The configuration information of the macro cell according to the present invention may have at least one of the pieces of configuration information.

At step 335, the small cell generates the reconfiguration information of the small cell at a level that does not exceed the capability of the UE using the provided macro cell configuration information.

At step 340, the small cell transmits the reconfiguration information to the macro cell.

At step 345, the macro cell stores the reconfiguration information of the small cell.

At step 350, the macro cell generates one RRC message that includes the reconfiguration information, and forwards the RRC message to the UE.

At step 355, one RRC message that includes the reconfiguration information is transmitted to the UE.

At step 360, the UE applies the reconfiguration information to itself.

At step 365, the UE transmits a response message to the RRC message to the macro cell base station.

At step 370, the macro cell base station transmits the response message to the small cell base station. The message notifies that the reconfiguration of the small cell has been successfully transferred to the UE.

Accordingly, at step 375, the small cell base station applies the reconfiguration information to itself.

In the above-described process, it can be known that the time when the UE obtains the reconfiguration information of the small cell and applies the reconfiguration information to itself is different from the time when the small cell applies the to reconfiguration information to itself. Such mismatch between the time points when the reconfiguration information is applied may cause an error to occur in the communication between the small cell base station and the UE. Accordingly, it is necessary to apply the reconfiguration information to the small cell base station and the UE at about the same time point. There may be various methods that can improve this.

1) First method: First method is to activate the SCell of the small cell from the time point when the small cell base station decides the reconfiguration or transfers the reconfiguration information of the small cell to the macro cell base station to the time point when the small cell base station receives the response message of the UE via the macro cell base station after deactivating the SCell of the small cell.

2) Second method: Second method is to define the time point when applying reconfiguration information explicitly or implicitly. For example, the second method applies the reconfiguration of the small cell at the next start time point of a modification period. That is, the small cell and the UE apply the reconfiguration information based on the implicitly predefined time point.

3) Third method: After receiving the reconfiguration information from the macro cell base station, the UE performs a random access process with respect to the small cells. Then, the UE notifies the small cell base station that the UE is ready to perform application. After the random access process, the small cell and the UE simultaneously apply the reconfiguration.

Figure 4:
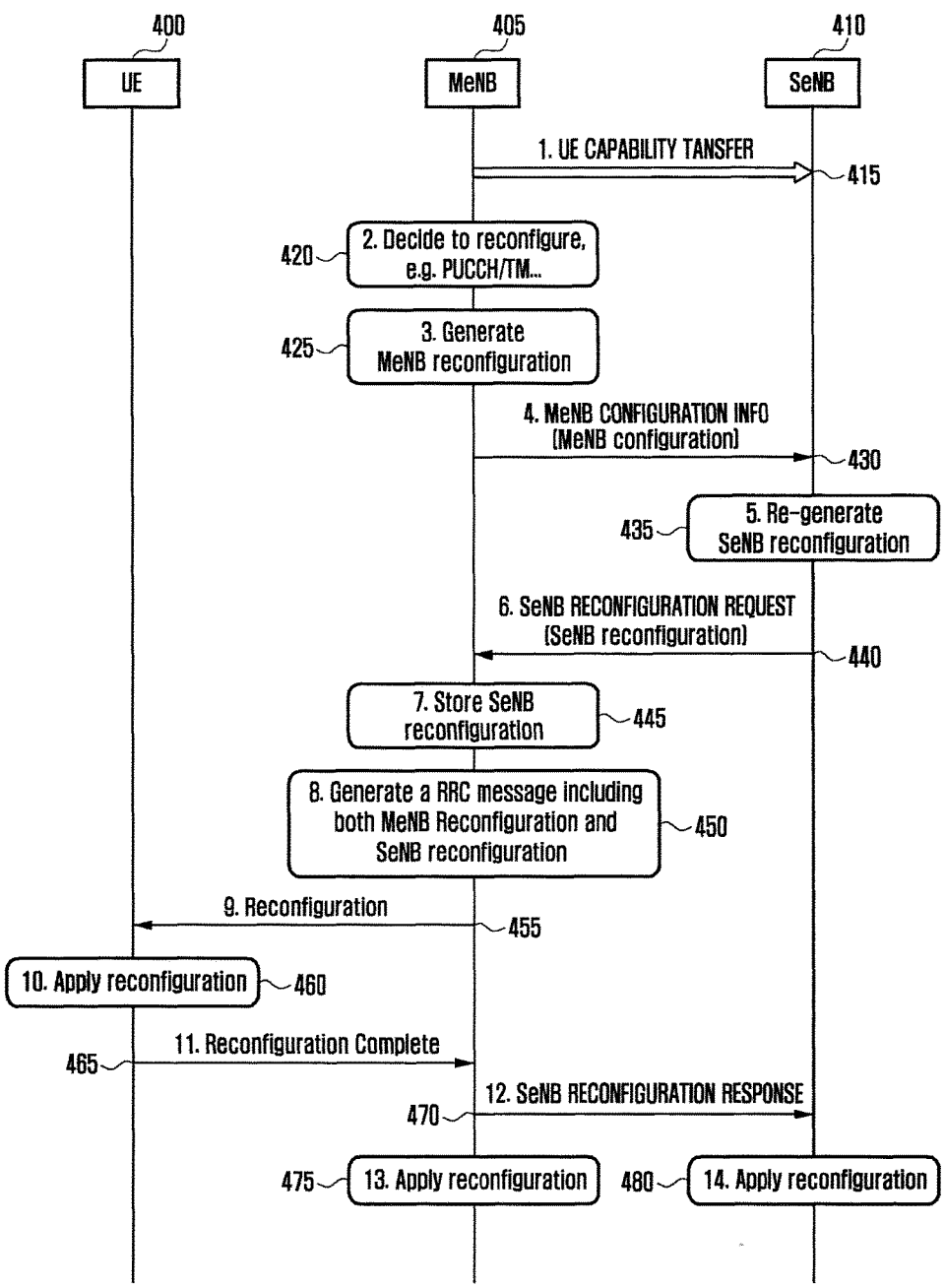
FIG. 4 is an operational flowchart explaining a small cell reconfiguration process that is caused by macro cell reconfiguration according to embodiment 1.

FIG. 4 is an operational flowchart explaining a small cell reconfiguration process that is caused by macro cell reconfiguration according to embodiment 1. At step 415, a macro cell 405 provides, in advance, capability information of the UE to a small cell 410 at a specific time.

Unlike FIG. 3, at step 420, the macro cell base station decides the reconfiguration.

At step 425, the macro cell base station generates the reconfiguration information. In the present invention, it is assumed that the priority order for the configuration is in the macro cell. Accordingly, the reconfiguration information that is generated by the macro cell may force the small cell to change the configuration information.

If the configuration information of the small cell should be changed due to the reconfiguration information of the macro cell in the above-described process, the macro cell base station, at step 430, requests suitable reconfiguration from the small cell so that the reconfiguration does not exceed the capability of the UE together with the reconfiguration information of the macro cell.

At step 435, the small cell generates the reconfiguration.

At step 440, the small cell base station transmits the reconfiguration information of the small cell to the macro cell base station.

At step 445, the macro cell base station stores the received reconfiguration information, and then, at step 450, the macro cell base station generates an RRC message that includes both the reconfiguration information of the macro cell and the reconfiguration information of the small cell.

The two pieces of reconfiguration information as described above may also be able to be transmitted as RRC messages that are separated from each other.

At step 455, the RRC message that includes the reconfiguration information is transmitted to the UE. At step 460, the UE applies the reconfiguration information to itself.

At step 465, the UE transmits a response message to the RRC message to the macro cell base station.

At step 470, the macro cell base station transmits the response message to the small cell base station.

The message notifies that the reconfiguration information of the macro cell and the small cell has been successfully transferred to the UE, and at steps 475 and 480, the macro cell and small cell base stations apply the reconfiguration information to is themselves.

Figure 5:
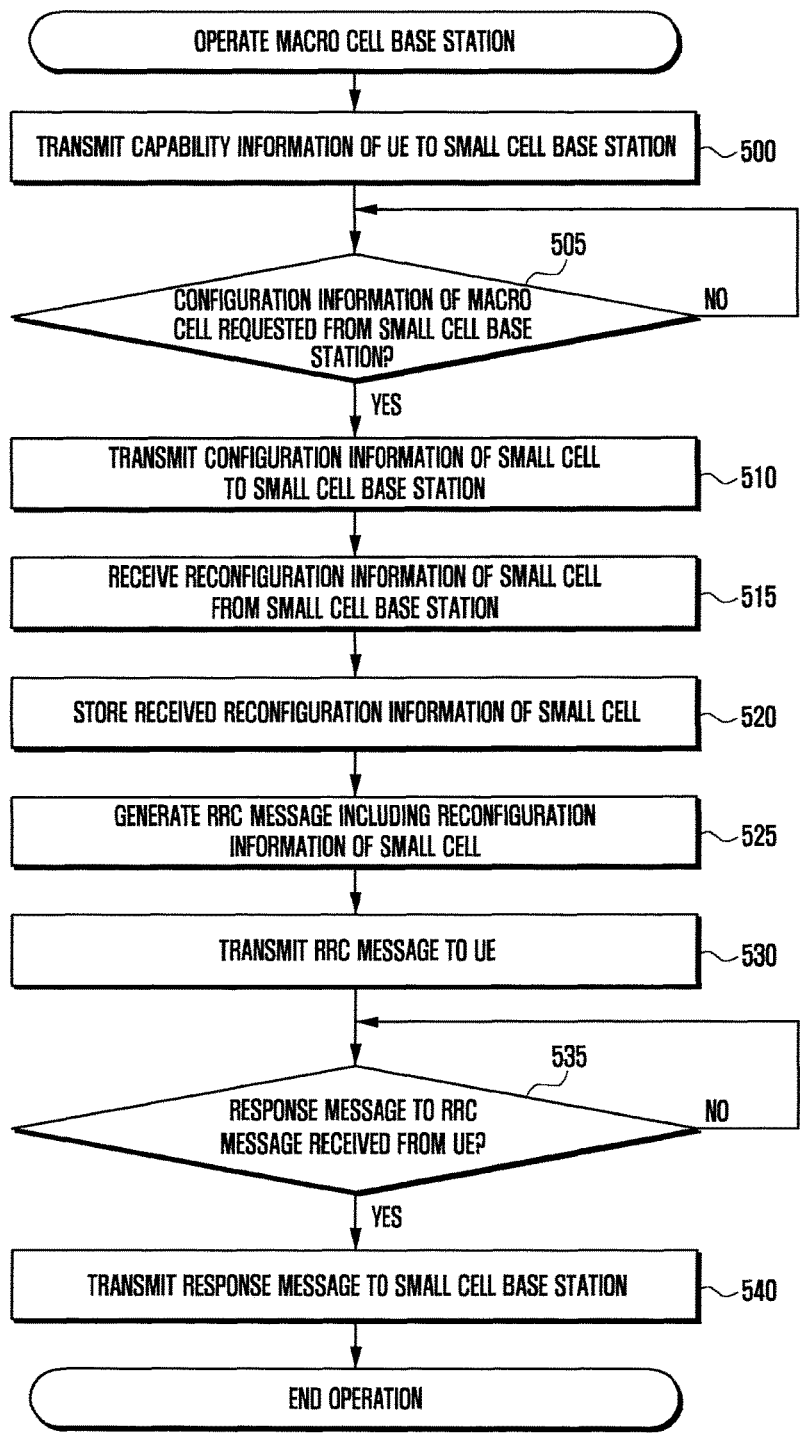
FIG. 5 is a diagram explaining the operation of a macro cell base station in a small cell reconfiguration process proposed in embodiment 1.

FIG. 5 is a diagram explaining the operation of a macro cell base station in a small cell reconfiguration process proposed in embodiment 1.

At step 500, a macro cell base station transmits capability information of UE to a small cell base station.

At step 505, the macro cell base station determines whether configuration information of the macro cell has been requested from the small cell base station. If requested, at step 510, the macro cell base station transmits the configuration information of the macro cell to the small cell base station.

At step 515, the macro cell base station receives reconfiguration information of a small cell from the small cell base station. At step 520, the macro cell base station may store the received reconfiguration information of the small cell. Hereafter, the information may be used for reconfiguration of the macro cell.

At step 525, the macro cell base station generates one RRC message that includes the reconfiguration information of the small cell. At step 530, the macro cell base station transmits the RRC message to the UE.

At step 535, the macro cell base station determines whether a response message to the RRC message has been received from the UE. If received, at step 540, the macro cell base station transmits the response message to the small cell base station.

Figure 6:
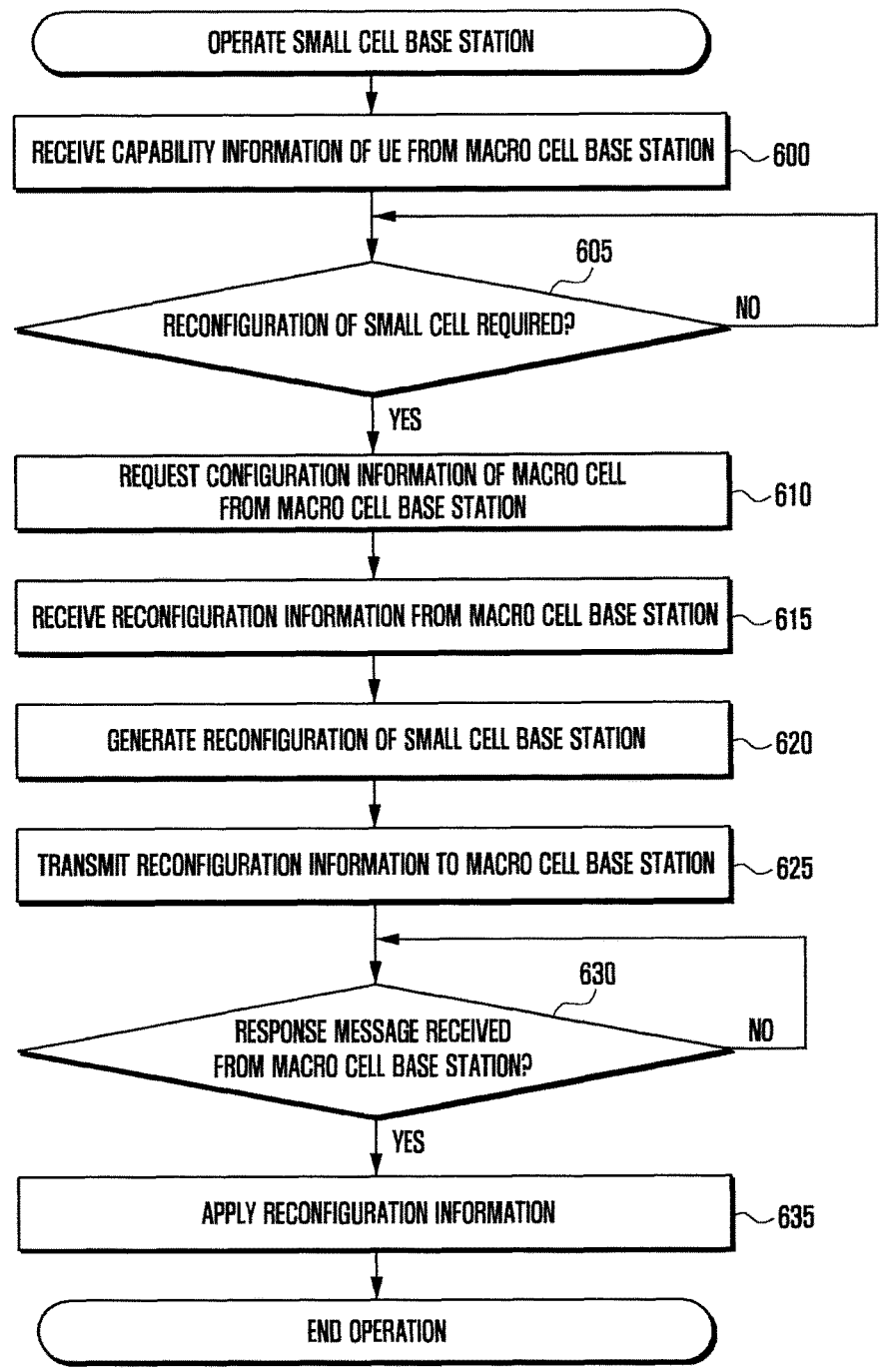
FIG. 6 is a diagram explaining the operation of a small cell base station in a small cell reconfiguration process proposed in embodiment 1.

FIG. 6 is a diagram explaining the operation of a small cell base station in a small cell reconfiguration process proposed in embodiment 1.

At step 600, a small cell base station receives capability information of UE from a macro cell base station. At step 605, the small cell base station determines whether reconfiguration is required in serving the UE. If needed, at step 610, the small cell base is station requests configuration information of a macro cell that is currently applied from the macro cell base station. At step 615, the small cell base station receives the reconfiguration information from the macro cell base station. At step 620, the small cell base station generates reconfiguration information. At step 625, the small cell transmits the reconfiguration information to the macro cell base station. At step 630, the small cell base station determines whether a response message is received from the macro cell base station. If received, at step 635, the small call base station applies the reconfiguration information.

<Embodiment 2>

In embodiment 2, an RRC message for reconfiguring a small cell is made through an RRC that is located in a small cell base station. Further, the generated RRC message is transferred to UE through a small cell base station. That is, in embodiment 2 of the present invention, reconfiguration that is required in a macro cell base station or a small cell base station is performed in a manner that the RRC generates a related RRC message and directly transmits the generated message to the UE.

Figure 7:
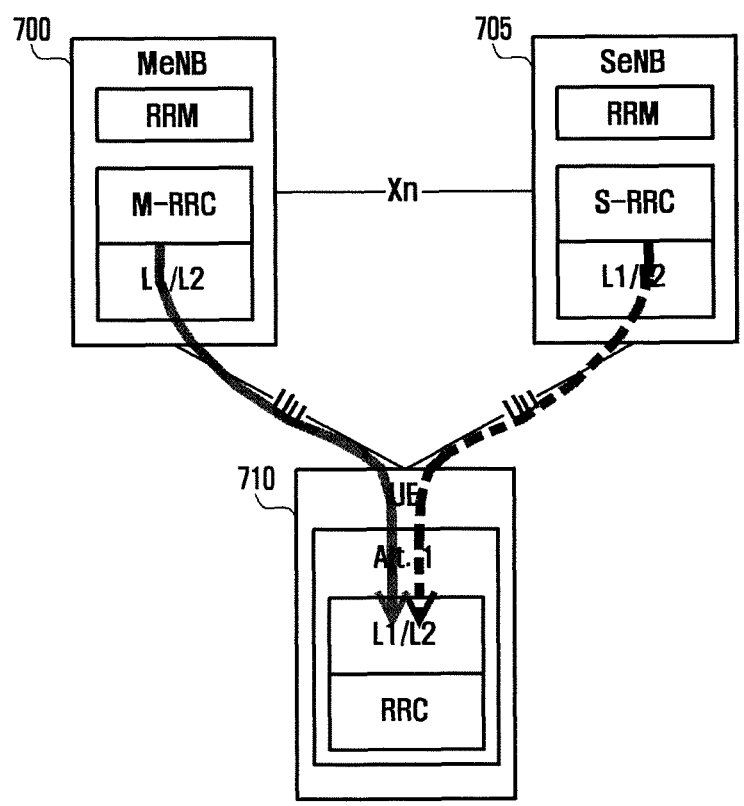
FIG. 7 is a conceptual diagram explaining small cell reconfiguration proposed in embodiment 2.

FIG. 7 is a conceptual diagram explaining small cell reconfiguration proposed in embodiment 2.

A small cell base station 705 according to embodiment 2 of the present invention has not only an RRM that performs limited functions but also an independent RRC and L1/2 layers. Accordingly, in the same manner as a macro cell base station 700, the small cell base station may directly generate and transmit a related RRC message to UE 710.

Figure 8:
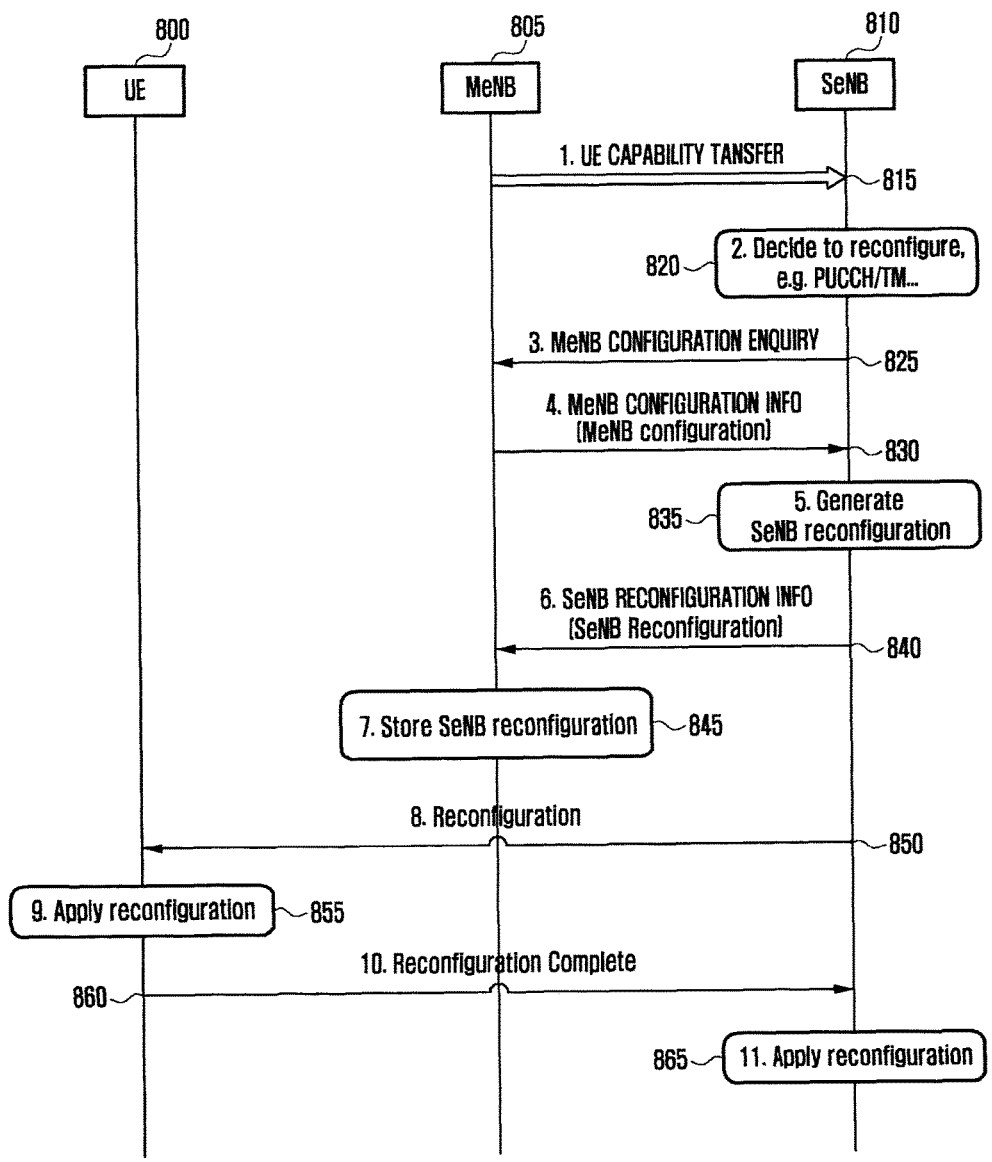
FIG. 8 is an operational flowchart explaining a small cell reconfiguration process proposed in embodiment 2.

FIG. 8 is an operational flowchart explaining a small cell reconfiguration process proposed in embodiment 2.

At step 815, a macro cell 805 provides, in advance, capability information of UE is to a small cell 810 at a specific time.

At step 820, the small cell decides reconfiguration. For example, the reconfiguration may be decided to change PUCCH or a Transmission Mode (TM). In order for the small cell to generate reconfiguration information, it is necessary for the small cell to know configuration information of a macro cell in advance. This is because the reconfiguration of the small cell should not exceed the capability of UE. Since a method in which the small cell obtains the configuration of the macro cell has been proposed with reference to FIG. 3, the detailed explanation thereof will be omitted in this drawing. In this drawing, the first method among the above-described methods is illustrated.

At step 825, a small cell base station requests the latest macro cell configuration information from a macro cell base station. At step 830, the macro cell base station provides the macro cell configuration information to the small cell base station. The macro cell configuration information has been described in detail with reference to FIG. 3.

In the present invention, the macro cell configuration information has at least one of the pieces of configuration information as described above.

At step 835, the small cell generates reconfiguration information of the small cell at a level that does not exceed the capability of the UE using the provided macro cell configuration information.

At step 840, the small cell transmits the reconfiguration information to the macro cell.

At step 845, the macro cell stores the reconfiguration information of the small cell.

At step 850, the small cell generates one RRC message that includes the reconfiguration information, and transmits the RRC message to the UE. As described is above, embodiment 2 is different from embodiment 1 on the point that the small cell directly transmits the reconfiguration information that is generated by the small cell itself to the UE.

At step 855, the UE applies the reconfiguration information. At step 860, the UE transmits a response message to the RRC message to the small cell base station. At step 865, the small cell base station applies the reconfiguration information.

Figure 9:
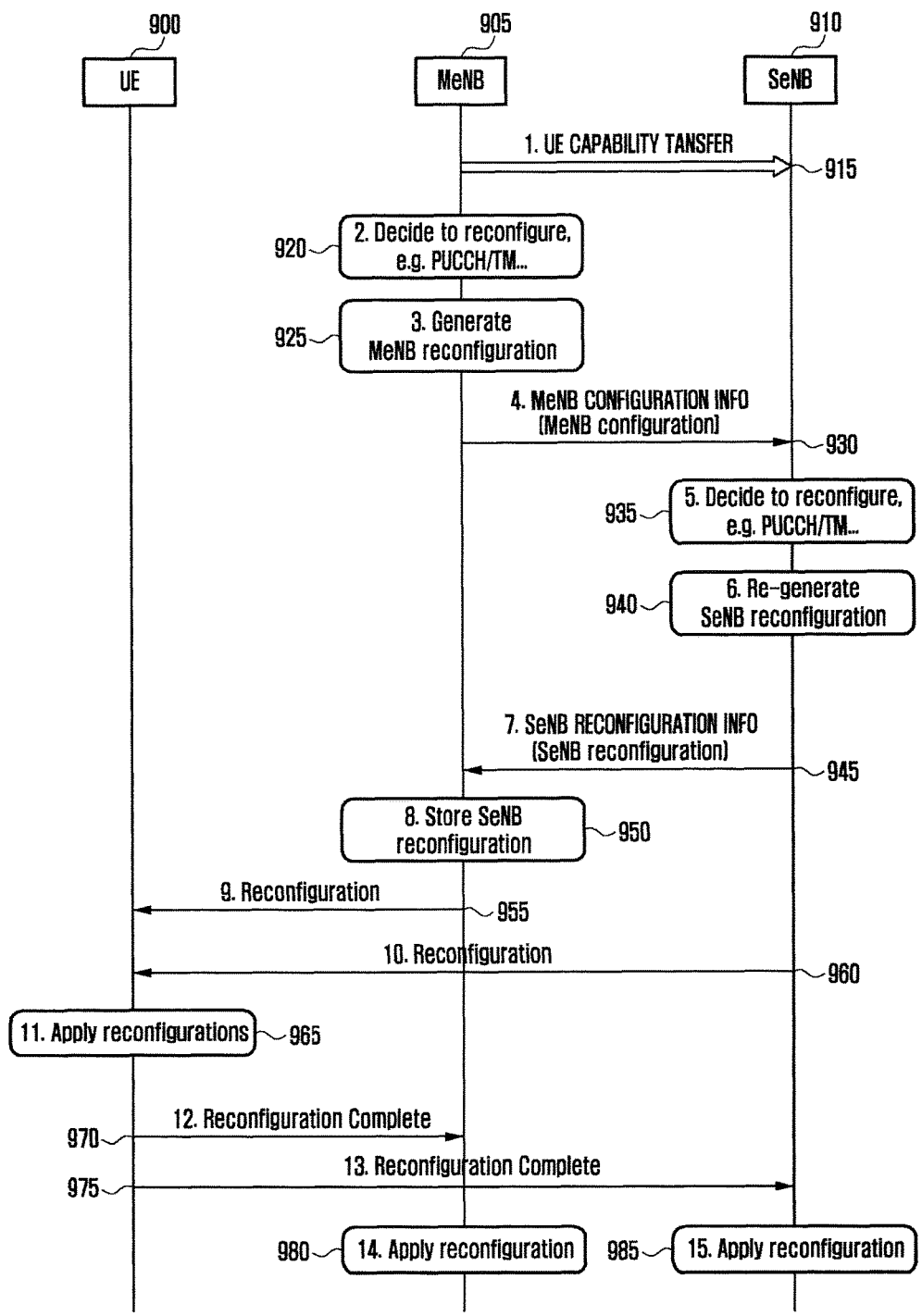
FIG. 9 is an operational flowchart explaining a small cell reconfiguration process that is caused by macro cell reconfiguration according to embodiment 2.

FIG. 9 is an operational flowchart explaining a small cell reconfiguration process that is caused by macro cell reconfiguration according to embodiment 2.

At step 915, a macro cell 905 provides, in advance, capability information of UE to a small cell 910 at a specific time. Unlike FIG. 8, at step 920, the macro cell base station decides the reconfiguration.

At step 925, the macro cell base station generates the reconfiguration information. In the present invention, it is assumed that the priority order for the configuration is in the macro cell. Accordingly, the reconfiguration information that is generated by the macro cell may force the small cell to change the configuration information.

If the configuration information of the small cell should be changed due to the reconfiguration information of the macro cell, the macro cell base station, at step 930, requests suitable reconfiguration from the small cell so that the reconfiguration does not exceed the capability of the UE together with the reconfiguration information of the macro cell.

At step 935, the small cell decides the reconfiguration.

At step 940, the small cell base station re-generates the reconfiguration information of the small cell.

At step 945, the small cell base station transmits the reconfiguration information of the small cell to the macro cell base station.

At step 950, the macro cell base station stores the received reconfiguration information, and then, at step 955, the macro cell base station transmits the reconfiguration of the macro cell to the UE.

At step 960, the small cell base station transmits the reconfiguration information of the small cell to the UE. That is, the two pieces of reconfiguration information are also transmitted as RRC messages generated by the respective base stations.

At step 965, the UE applies the reconfiguration information.

At step 970, the UE transmits a response message to the RRC message to the macro cell base station.

At step 975, the UE transmits the response message to the RRC message to the small cell base station. The messages notify that the reconfiguration information of the macro cell and the small cell has been successfully transferred to the UE, and thus, at steps 980 and 985, the macro cell and the small cell base stations apply the reconfiguration information to themselves.

Figure 10:
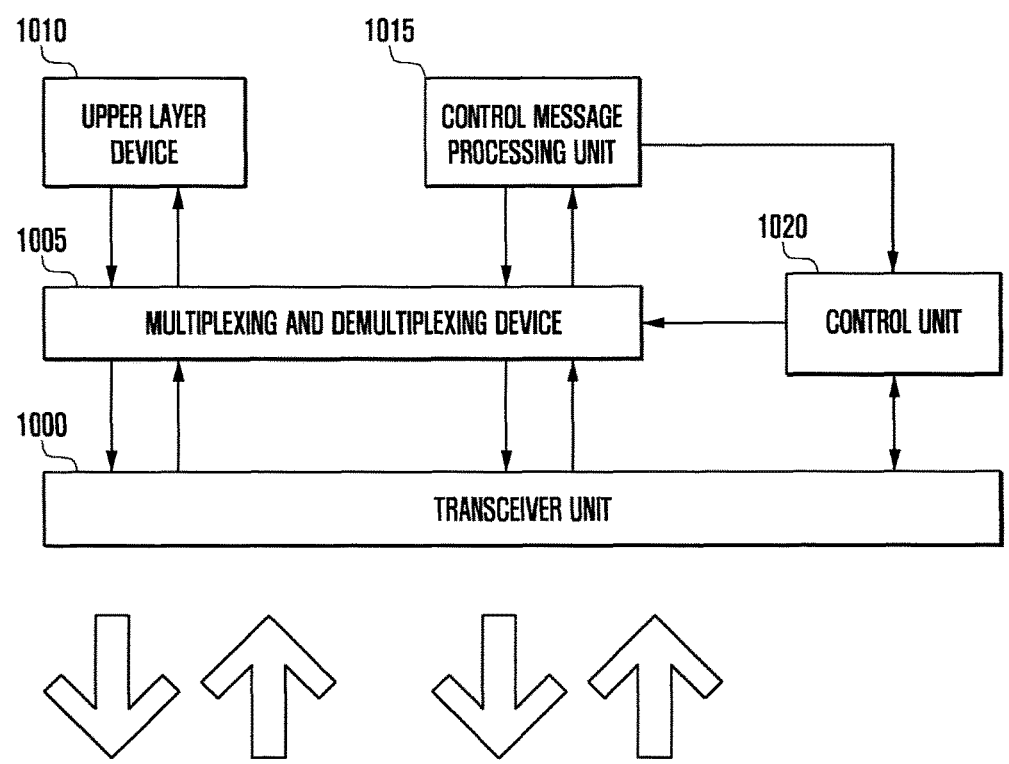
FIG. 10 is a block diagram illustrating the internal structure of UE to which the present invention is applied.

FIG. 10 is a block diagram illustrating the internal structure of UE to which the present invention is applied.

The UE transmits and receives data with an upper layer 1010, and transmits and receives control messages through a control message processing unit 1015. Then, when transmitting a control signal or data to the base station, the UE multiplexes the data through a multiplexing device 1005 under the control of a control unit 1020, and then transmits the data through a transmitter 1000. In contrast, when receiving, the UE receives a physical signal from the receiver 1000 under the control of the control unit 1020, demultiplexes the received signal through a demultiplexing device 1005, and then transfers the demultiplexed signal to the upper layer 1010 or the control message is processing unit 1015 in accordance with the message information.

Figure 11:
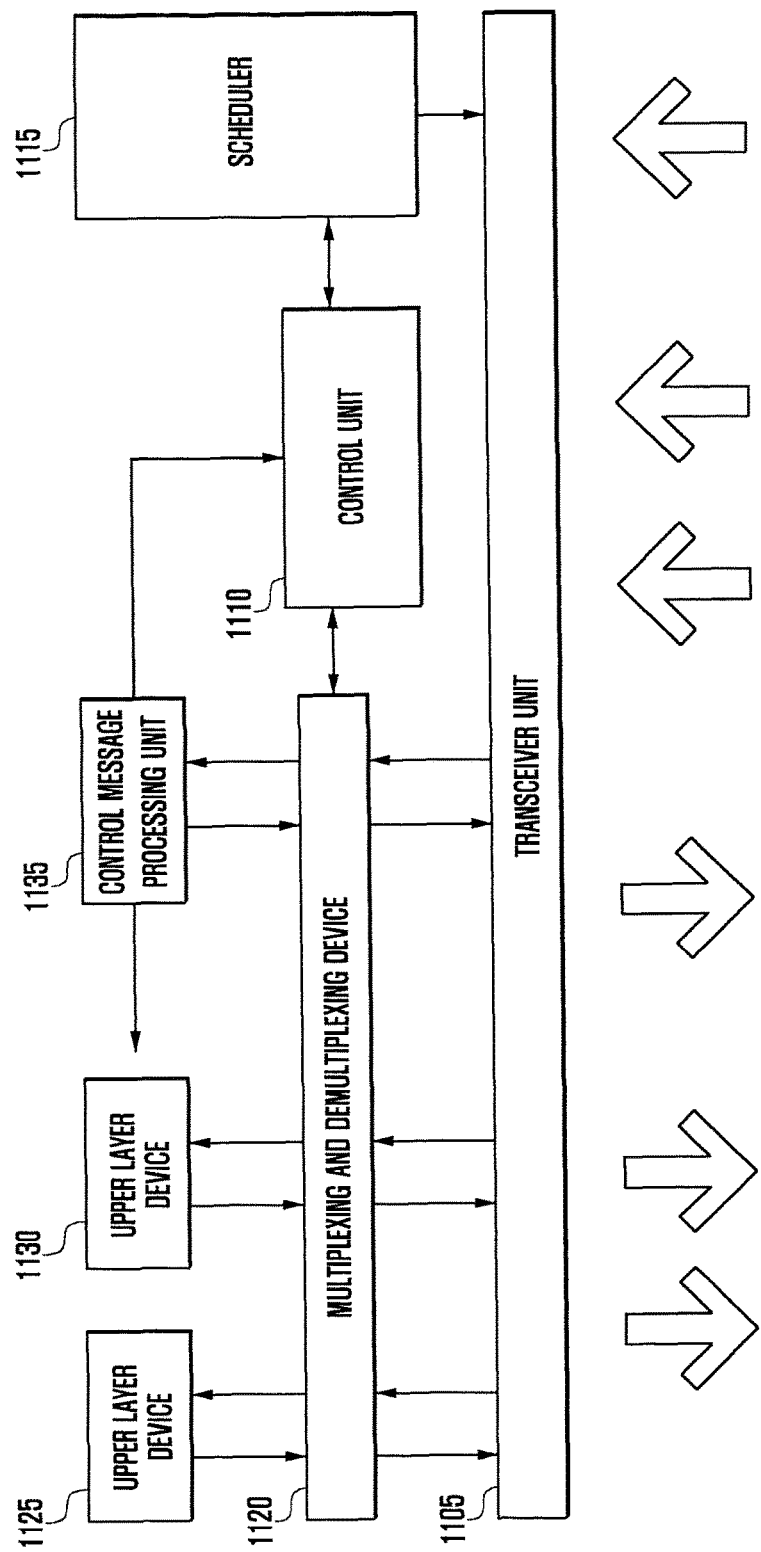
FIG. 11 is a block diagram illustrating the configuration of a base station according to the present invention.

FIG. 11 is a block diagram illustrating the configuration of a base station according to the present invention. A base station device of FIG. 11 includes a transceiver unit 1105, a control unit 1110, a multiplexing and demultiplexing unit 1120, a control message processing unit 1135, various kinds of upper layer processing units 1125 and 1130, and a scheduler 1115. The transceiver unit 1105 transmits data and a specific control signal with a forward carrier, and receives the data and the specific control signal with a reverse carrier. If a plurality of carriers are configured, the transceiver unit 1105 performs data transmission/reception and control signal transmission/reception with the plurality of carriers. The multiplexing and demultiplexing unit 1120 serves to multiplex the data that is generated by the upper layer processing units 1125 and 1130 or the control message processing unit 1135 or to demultiplex the data that is received by the transceiver unit 1105, and to properly transfer the multiplexed or demultiplexed data to the upper layer processing unit s 1125 and 1130, the control message processing unit 1135, or the control unit 1110. The upper layer processing units 1125 and 1130 may be configured by UEs and services, and process data generated in a user service, such as FTP or VoIP, to transfer the processed data to the multiplexing and demultiplexing unit 1120, or process data transferred from the multiplexing and demultiplexing unit 1120 to transfer the processed data to an upper layer service application. The scheduler 1115 transfers transmission resources to the UE at an appropriate time in consideration of a UE buffer state, a channel state, and a UE active time, and the transceiver processes the signal that is transmitted from the UE or transmits the signal to the UE.

<Embodiment 3>

Embodiment 3 of the present invention proposes a signaling process for addition, is to SeNB, correction, and release of SCell.

In the present invention, a macro cell configures RRM measurement for a small cell to UE, and receives a report of the measurement result from the UE. Further, based on reported information, the macro cell decides whether to add SCell to the small cell. When adding SCell, the macro cell connects to the small cell and tunes addition of SCell in advance before sending an RRCConnectionReconfiguration message for instructing the addition of SCell to the UE. Through the above-described tuning process, the small cell would transfer configuration information that is required to serve the UE to the macro cell. The macro cell transmits RRCConnectionReconfiguration message that includes the configuration information to the UE, and adds the SCell thereto.

As another alternative, in order to reduce time required to add the SCell, the macro cell may transmit an RRCConnectionReconfiguration message for instructing the addition of SCell to the UE before tuning with the small cell. In this case, the RRCConnectReconfiguration may include initial or default configuration information only. If the use frequency of SCell of the small cell previously set and being used becomes lowered or the radio channel state is not good, both the macro cell and the small cell may release the SCell of the small cell previously set and being used. In other words, in accordance with the user plane architecture, such as RAN-split or CN-split, the subject that instructs the release may differ. Here, the RAN-split structure designates that data to be transmitted from the small cell to the UE first passes through the macro cell to be transferred to the small cell through a backhaul, and then the small cell transfers this to the UE. In contrast, the CN-split designates that data to be transmitted from the small cell to the UE is directly transferred from a serving Gateway (GW) to the small cell. Whether the radio channel state is good may be determined on the basis of RRM measurement information on which the macro cell receives a report from the UE or CQI information on which the macro cell or the small cell receives a report from the UE. In the case where the macro cell instructs to release the SCell of the small cell, the macro cell would connect to the small cell to tune this before transmitting the RRCConnectReconfiguration message for instructing this to the UE.

The macro cell and the small cell may change the SCell configuration. For example, If the macro cell wants to use much more portions of UE capability (i.e., if the macro cell wants to use much more SCells in a state where SCells that can be supported by the UE are used by the macro cell and the small cell), the macro cell may change the SCell configuration of the small cell. In performing the SCell addition and release, complexity may be reduced using the same signaling sequence (e.g., SCellToAddModList). In the case of the CN-split structure, the small cell may not be equal to processing of all data allocated to the small cell with given SCells. In this case, the small cell may request additional allocation of the SCells from the macro cell.

Figure 12:
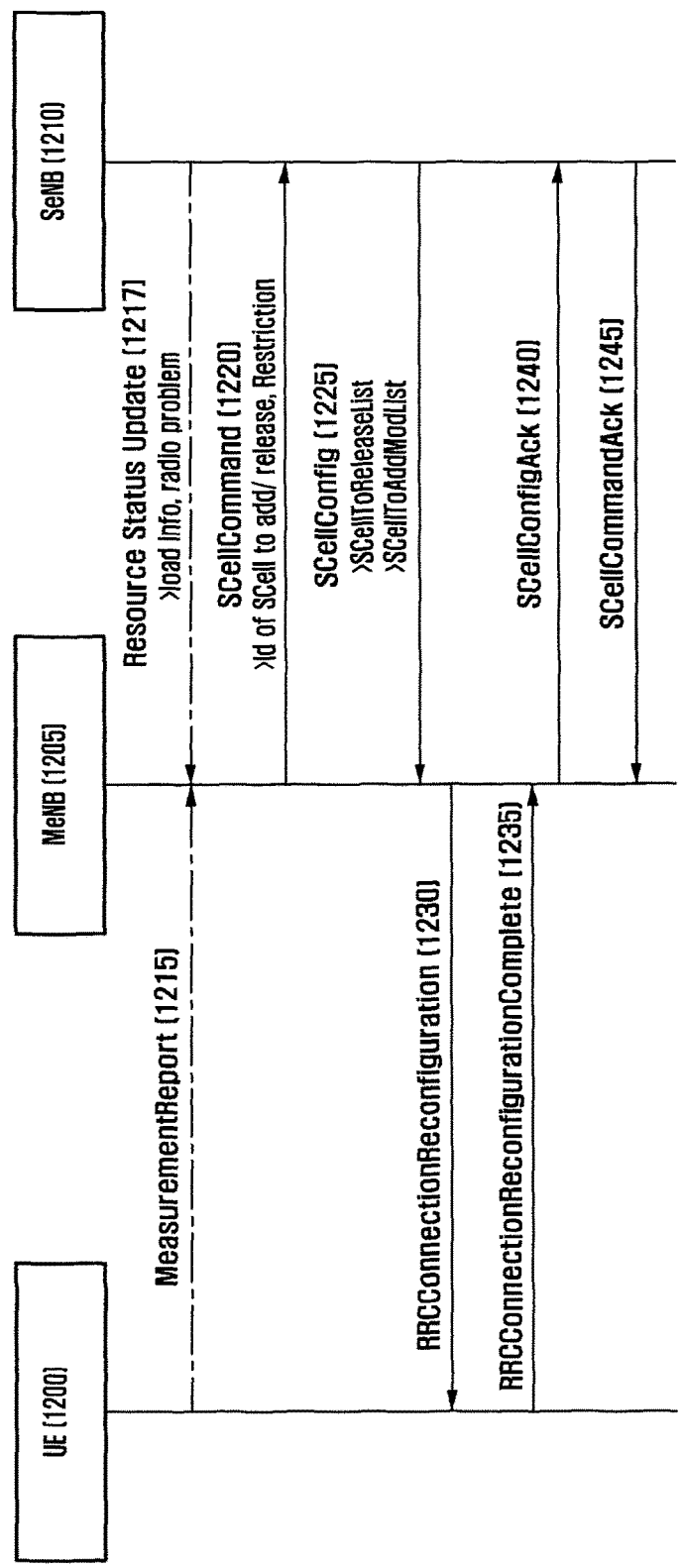
FIG. 12 is a flowchart explaining a trigger operation performed by a macro cell according to embodiment 3.

FIG. 12 is a flowchart explaining a trigger operation performed by a macro cell according to embodiment 3.

A UE 1200 reports measurement information for SCell that can be provided by a small cell 1210 to a macro cell 1205 using a MeasurementReport 1215. The measurement report is configured, in advance, to be performed by the macro cell with respect to the UE. Further, the macro cell may directly receive a report on small cell load information and radio channel state from the small cell. The small cell directly reports a to ResourceStatusUpdate message 1217 that includes the above-described information to the macro cell. Once a specific trigger condition is satisfied, the message will be transmitted to the macro cell.

For example, if the load of the small cell is increased over a predetermined threshold value or the radio channel state (e.g., based on CQI) of the specific SCell of is the small cell becomes worse off than a specific threshold value, the small cell notifies the macro cell of such a fact. The above-described threshold value and the trigger conditions may be predetermined, or the macro cell may configure in advance and notify the small cell of this. If the macro cell configures them in advance, a ResourceStatusRequest message may be newly defined, and configuration information related to the small cell report, i.e., report trigger events/conditions and related threshold values, may be included in this message. The macro cell and the small cell may be connected to each other through Xn interfaces, and exchange necessary information through the interfaces. Messages newly defined for the Xn interfaces are listed again in Table 1 below.

Using the report information, the macro cell determines whether to add SCell to the small cell or to release the SCell being used. On the other hand, even in the case where SCell is additionally necessary in the macro cell, the small cell may release the SCell being used. The macro cell may connect to the small cell and transmit a SCellCommand message 1220 to the small cell before configuring the addition of SCell to the UE or the release of the SCell. In the case of adding the SCell to the small cell, the message includes an ID of the SCell to be added and frequency information. Further, the message may include restriction information that can be configured in the small cell. The restriction information means configuration information that can be configured by the small cell or restriction of the UE capability. The UE capability is limited, and thus it is required for the macro cell and the small cell to dividedly use the UE capability. Further, the configuration information of the macro cell and the small cell should not exceed the UE capability. For example, if a specific UE has the capability of being able to use two frequency bands in all, the frequency band that the macro cell and the small cell use would not exceed the two bands as described above. Further, the specific cell should not use frequency bands that are used by other cells. That is, the macro cell should provide the restriction information to the small cell so that the small cell uses one specific frequency band to prevent the small cell from violating the frequency band that the macro cell itself uses. If the macro cell does not provide the restriction information, the restriction information that the macro cell previously provided may be continuously applied. The small cell generates SCell configuration information using the above-described information provided by the macro cell, and provides this to the macro cell. An example of the SCell configuration information has already been enumerated with reference to FIG. 3. The SCell configuration information is transferred to the macro cell using SCellloAddModList IE of the SCellConfig message 1225. Even in the case where the macro cell releases the SCell of the small cell, the same process as the process in the case of adding the SCell is performed. The macro cell transmits the ID of the SCell to be released and the frequency information to the small cell. Even in the case where the macro cell wants to change the restriction information that is applied to the small cell, the same process is used. The small cell provides new SCell configuration information that reflects the changed restriction information to the macro cell using the SCellToAddModList IE in the SCellConfig message. After tuning with the small cell, the macro cell transmits the SCell configuration information that is transferred from the small cell to the UE using the RRCConnectionReconfiguration message 1230. The UE transmits an RRCConnectionReconfigurationComplete message 1235 to the macro cell to as a response message. At the same time, the macro cell and the small cell exchange response messages to the SCellCommand message and the SCellConfig message, i.e., a SCellConfigAck message 1240 and a SCellCommandAck message 1245.

Figure 13:
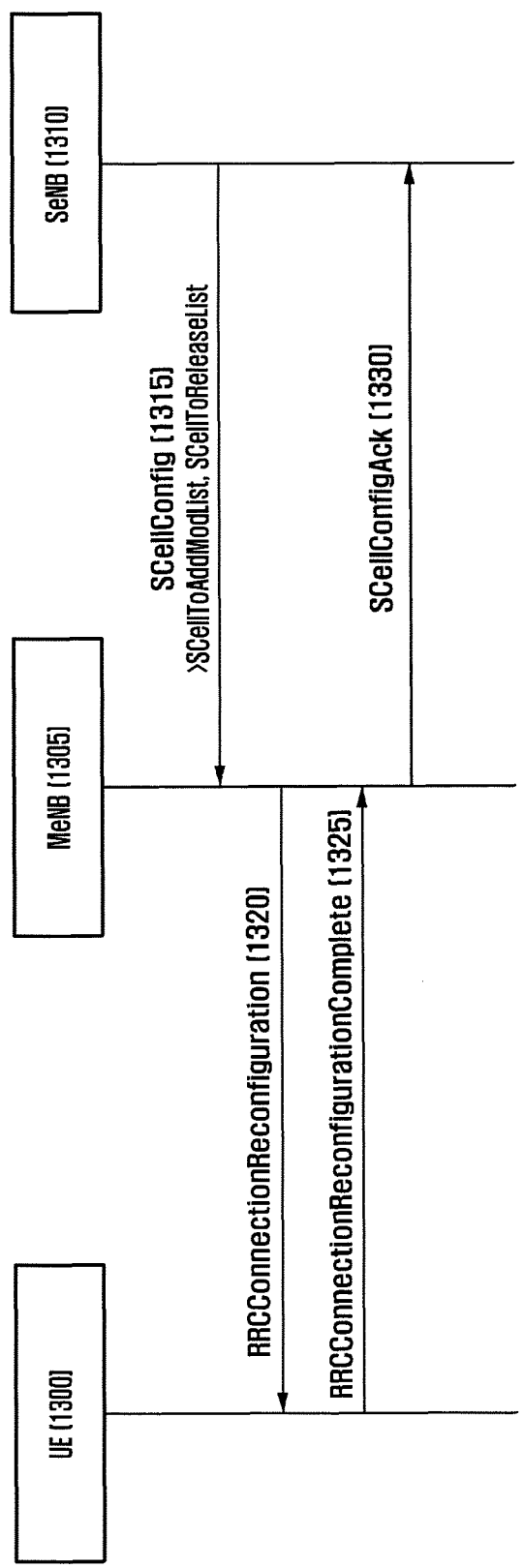
FIG. 13 is a flowchart explaining a trigger operation performed by a macro cell according to embodiment 3.

FIG. 13 is a flowchart explaining a trigger operation performed by a macro cell according to embodiment 3.

As described above, a small cell 1310 may change or release SCell configuration information. If the above-described operation is wanted, the small cell transfers this to a macro cell 1305 using a SCellConfig message 1315. The macro cell transfers this to UE 1300, without processing the configuration, using an RRCConnectionReconfiguration message 1320. Accordingly, the UE transmits a response message to the macro cell using an RRCConnectionReconfiguraiton Complete message 1325. At the same time, the macro cell transmits a response message to the SCellConfig message, i.e., a SCellConfigAck message 1330, to the small cell.

Messages of Xn interfaces newly defined in the above-described processes are listed in Table 1 below. "Class 1 procedure" has already been mentioned during explanation of the above-described processes, and includes information that is necessary to add, correct, or release the SCell. Further, according to the purpose, the included IE may differ. In the present invention, A SCellCommand includes restriction information, and notifies the small cell of a limit value that the small cell can configure so that the configuration information of the macro cell and the small cell does not exceed the UE capability. As still another alternative for securing the UE capability, the macro cell may notify the small cell of macro configuration information that is currently applied by the macro cell, configuration information of another small cell, and the UE capability. In this case, the small cell may determine its own configuration information at a level that does not exceed the UE capability based on such information.

TABLE 1

| Xn message | Description | Contents | Comment |
|---|---|---|---|
| SCellCommand(Ack) | Class 1 procedure (new) | RRC: SCellCommand | Restrictions/grant are very radio related, and hence this is best specified in RRC (inter node message) |
| SCellConfig(Ack) | Class 1 procedure (new) | RRC: SCellConfiguration | SCell configuration is very ratio related, and hence this is best specified in RRC (inter node message) |
| ResourceStatusRequest | Configuration parameters for additional reporting | | |
| ResourceStatusUpdate | Additional reporting information | Load information, radio problem indication | |

In the present invention, Uu signaling structure is proposed. A Uu interface means an interface between the UE and a base station, and Uu signaling means signaling between the UE and the base station. That is, a new Information Element (IE) may be included in the RRCConnectionReconfiguration message mentioned during explanation of the above-described operational processes. The newly included IE includes configuration information of the SCell of the small cell. The configuration information may include physical configuration information and MAC configuration information. The present invention proposes schemes for configuring a new IE in the RRCConnectionReconfiguration message. Briefly, two schemes are proposed.

a) Scheme for reusing the existing signaling structure (refer to scheme a) below)

b) Scheme for defining a field of a new upper level (refer to scheme b) below) According to the scheme a), the IE is added to a default extension position. According to the scheme b), a new ASN.1 structure for the SCell of the small cell is copied. In the schemes a) and b), the detailed ASN.1 format is as follows. The ASN.1 format relates to the RRCConnectionReconfiguration message that is one of the RRC messages. In the present invention, a portion that is newly added to the existing ASN.1 format will be described with reference to the respective Tables.

Scheme a) Re-use (and extend) the existing signaling structure for SCells controlled by an SeNB (in Tables 2 to 5 below, ([[sCellToAddModExt1-vxy0
  SCellToAddModExt1-vxy0 OPTIONAL-Need ON]], [[
  radioResourceConfigCommonSCell-vxy0
  RadioResourceConfigCommonSCell-vxy0 OPTIONAL-Need ON]] is a newly added portion)

TABLE 2

```
RRCConnectionReconfiguration-v1020-IEs ::= SEQUENCE {
    sCellToReleaseList-r10        SCellToReleaseList-r10        OPTIONAL,
    -- Need ON
    sCellToAddModList-r10         SCellToAddModList-r10         OPTIONAL,
    -- Need ON
    nonCriticalExtension          RRCConnectionReconfiguration-v1130-IEs
        OPTIONAL    -- Need OP
}
SCellToAddModList-r10 ::=    SEQUENCE [SIZE [1..maxSCell-r10]] OF
SCellToAddMod-r10
SCellToAddMod-r10 ::=        SEQUENCE {
    sCellIndex-r10                SCellIndex-r10,
    cellIdentification-r10        SEQUENCE {
        physCellId-r10                PhysCellId,
        dl-CarrierFreq-r10            ARFCN-ValueEUTRA
    }                                                             OPTIONAL,  --
Cond SCellAdd
    radioResourceConfigCommonSCell-r10   RadioResourceConfigCommonSCell-r10
        OPTIONAL, -- Cond SCellAdd
    radioResourceConfigDedicatedSCell-r10 RadioResourceConfigDedicatedSCell-r10
        OPTIONAL, -- Cond SCellAdd2
    ...,
    [[ dl-CarrierFreq-v1090        ARFCN-ValueEUTRA-v9e0  OPTIONAL  --
    Cond
    EARFCN-max
    ]],
    [[ sCellToAddModExt1-vxy0      SCellToAddModExt1-vxy0
    OPTIONAL  --
    Need ON
```

TABLE 3

```
    ]]
}
SCellToReleaseList-r10 ::=    SEQUENCE [SIZE [1..maxSCell-r10]] OF
SCellIndex-r10
```

TABLE 3-continued

```
RadioResourceConfigCommonSCell-r10 ::=      SEQUENCE {
    -- DL configuration as well as configuration applicable for DL and UL
    nonUL-Configuration-r10         SEQUENCE {
        -- 1: Cell characteristics
        dl-Bandwidth-r10            ENUMERATED {n6, n15, n25, n50, n75,
n100},
        -- 2: Physical configuration, general
        antennaInfoCommon-r10           AntennaInfoCommon.
        mbsfn-SubframeConfigList-r10        MBSFN-SubframeConfigList OPTIONAL,
    -- Need OR
        -- 3: Physical configuration, control
        phich-Config-r10            PHICH-Config,
        -- 4: Physical configuration, physical channels
        pdsch-ConfigCommon-r10          PDSCH-ConfigCommon,
        tdd-Config-r10          TDD-Config              OPTIONAL
    -- Cond TDDSCell
    },
    -- UL configuration
    ul-Configuration-r10            SEQUENCE {
        ul-FreqInfo-r10             SEQUENCE {
            ul-CarrierFreq-r10          ARFCN-ValueEUTRA
    OPTIONAL, -- Need OP
            ul-Bandwidth-r10                ENUMERATED {n6, n15,
                n25, n50, n75, n100}            OPTIONAL,
    -- Need OP
```

TABLE 4

```
            additionalSpectrumEmissionSCell-r10             AdditionalSpectrumEmission
        },
        p-max-r10           P-Max           OPTIONAL,
-- Need OP
        uplinkPowerControlCommonSCell-r10
UplinkPowerControlCommonSCell-r10,
        --A special version of IE UplinkPowerControlCommon may be introduced
        -- 3: Physical configuration, control
        soundingRS-UL-ConfigCommon-r10      SoundingRS-UL-ConfigCommon,
        ul-CyclicPrefixLength-r10       UL-CyclicPrefixLength,
        -- 4: Physical configuration, physical channels
        prach-ConfigSCell-r10           PRACH-ConfigSCell-r10
    OPTIONAL     -- Cond TDD-OR-NoR11
        pusch-ConfigCommon-r10          PUSCH-ConfigCommon
    }                       OPTIONAL,
    -- Need OR
    ...,
    [[ ul-CarrierFreq-v1090      ARFCN-ValueEUTRA-v9e0
    [[ OPTIONAL    -- Need OP
    ]],
    [[ rach-ConfigCommonSCell-r11   RACH-CommonSCell-r11
        OPTIONAL, -- Cond UL
        prach-ConfigSCell-r11       PRACH-Config            OPTIONAL,
    -- Cond UL
        tdd-Config-v1130        TDD-Config-v1130            OPTIONAL,
    -- Cond TDD2
        uplinkPowerControlCommonSCell-v1130
                UplinkPowerControlCommonSCell-v1130 OPTIONAL    --
Cond UL
```

TABLE 5

```
]]
[[radioResourceConfigCommonSCell-vxy0
[[RadioResourceConfigCommonSCell-vxy0 OPTIONAL   -- Need ON
]]
}
RadioResourceConfigDedicatedSCell-r10 ::=    SEQUENCE {
    -- UE specific configuration extensions applicable for an SCell
    physicalConfigDedicatedSCell-r10   PhysicalConfigDedicatedSCell-r10
OPTIONAL, -- Need ON
    ...,
    [[ mac-MainConfigSCell-r11      MAC-MainConfigSCell-r11
    [[ OPTIONAL -- Cond SCellAdd
    ]],
```

TABLE 5-continued

```
    [[ radioResourceConfigDedicatedSCell-vxy0
        RadioResourceConfigDedicatedSCell-vxy0 OPTIONAL    -- Need ON
    ]]
}
```

Scheme b) Introduce new top level fields for the SCells configured by an SeNB (in Tables 6 to 8 below, (RRCConnectionReconfiguration-v12x0-IEs}RRCConnectionReconfiguration-v12x0-IEs::=SEQUENCE {ssCellToReleaseList-r10 SCellToReleaseList-r10 OPTIONAL, -Need ON ssCellToAddModList-r10 SSCellToAddModList-r12 OPTIONAL, -Need ON nonCriticalExtension SEQUENCE { } OPTIONAL-Need OP,SCellToAddModList-r10::=SEQUENCE (SIZE (1..maxSCell-r10)) OF to SSCellToAddMod-r12, SSCellToAddMod-r10::=SEQUENCE {sCellToAddMod-r12

SCellToAddMod-r10 OPTIONAL, -Need ON
sCellToAddModExt1-v12x0   SCellToAddModExt1-v12x0 OPTIONAL -Need ON} is a newly added portion.

TABLE 6

```
RRCConnectionReconfiguration-v1020-IEs ::= SEQUENCE {
    sCellToReleaseList-r10      SCellToReleaseList-r10        OPTIONAL,
    -- Need ON
    sCellToAddModList-r10       SCellToAddModlist-r10         OPTIONAL,
    -- Need ON
    nonCriticalExtension        RRCConnectionReconfiguration-v1130-IEs
OPTIONAL  -- Need OP
}
RRCConnectionReconfiguration-v1130-IEs ::= SEQUENCE {
    systemInfomationBlockTypeDedicated-r11    OCTET STRING (CONTAINING
SystemInformationBlockType1)
            OPTIONAL,  -- Need ON
    nonCriticalExtension        RRCConnectionReconfiguration-v12x0-IEs OPTIONAL
    -- Need OP
}
RRCConnectionReconfiguration-v12x0-IEs ::= SEQUENCE {
    ssCellToReleaseList-r10     SCellToReleaseList-r10        OPTIONAL,
    -- Need ON
    ssCellToAddModlist-r10      SSCellToAddModList-r12
OPTIONAL, -- Need ON
    nonCriticalExtension        SEQUENCE { }                  OPTIONAL  --
Need OP
}
SCellToAddModList-r10 ::=    SEQUENCE [SIZE [1..maxSCell-r10]] OF
SCellToAddMod-r10
SCellToAddModList-r10 ::=    SEQUENCE [SIZE [1..maxSCell-r10]] OF
SSCellToAddMod-r12
```

TABLE 7

```
SCellToAddMod-r10 ::=         SEQUENCE {
    sCellIndex-r10               SCellIndex-r10,
    cellIdentification-r10       SEQUENCE {
        physCellId-r10              PhysCellId,
        dl-CarrierFreq-r10          ARFCN-ValueEUTRA
    }                                        OPTIONAL,     --
Cond SCellAdd
    radioResourceConfigCommonSCell-r10  RadioResourceConfigCommonSCell-r10
        OPTIONAL -- Cond SCellAdd
    radioResourceConfigDedicatedSCell-r10 RadioResourceConfigDedicatedSCell-r10
        OPTIONAL, -- Cond SCellAdd2
    ...,
    [[ dl-CarrierFreq-v1090      ARFCN-ValueEUTRA-v9e0    OPTIONAL    --Cond
EARFCN-max
    ]]
}
SSCellToAddMod-r10 ::=    SEQUENCE {
    sCellToAddMod-r12            SCellToAddMod-r10         OPTIONAL,--
Need ON
    sCellToAddModExt1-v12x0      SCellToAddModExt1-v12x0   OPTIONAL
    -- Need ON
}
SCellToReleaselist-r10 ::=    SEQUENCE [SIZE [1..maxSCell-r10]] OF
SCellIndex-r10
```

TABLE 8

```
SecurityConfigHO ::=       SEQUENCE {
    handoverType              CHOICE {
        IntraLTE                 SEQUENCE {
            securityAlgorithmConfig    SecurityAlgorithmConfig
               OPTIONAL,
            -- Cond fullConfig
            keyChangeIndicator         BOOLEAN,
```

TABLE 8-continued

```
    nextHopChainingCount        NextHopChainingCount
  },
    interRAT          SEQUENCE {
    securityAlgorithmConfig      SecurityAlgorithmConfig,
    nas-SecurityParamToEUTRA     OCTET STRING [SIZE[6]]
    }
  },
  ...
}
```

<Embodiment 4>

In this embodiment, a method for discriminating whether reconfiguration information of the small cell is sent through a request from the macro cell or through generation by the small cell itself when a macro cell base station receives the reconfiguration information.

Figure 14:
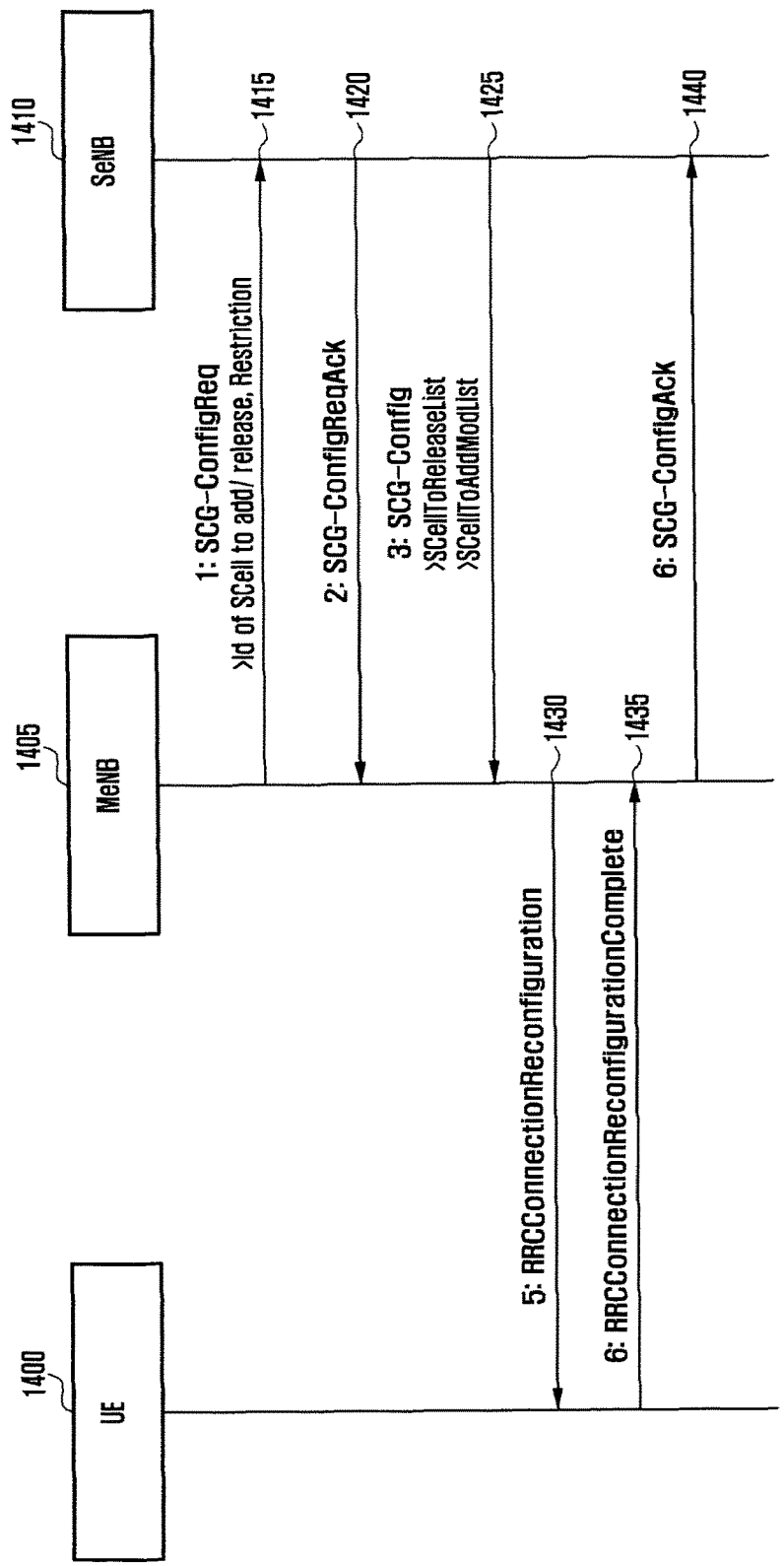
FIG. 14 is a diagram explaining a small cell reconfiguration process according to an embodiment of the present invention.

FIG. 14 is a diagram explaining a small cell reconfiguration process according to an embodiment of the present invention.

There are two cases where a small cell 1410 sends reconfiguration information of the small cell to a macro cell 1405.

One is a base where the macro cell requests reconfiguration of the small cell. As illustrated at step 1415, when SCell of the small cell is added or released, or UE capability that is permitted for the small cell is changed, the macro cell may request the reconfiguration from the small cell. For this, a small cell group configuration request (SCG-ConfigReq) message is used, and this message may include an ID of SCell that is added or released and UE capability information that is permitted for the small cell.

Accordingly, at step 1420, the small cell 1410 transmits one response message indicating that the SCG-ConfigReq message has been successfully received to the macro cell using a small cell group configuration request acknowledgement (SCG-ConfigReqAck) message.

Then, at step 1425, the small cell transmits the reconfiguration information of the small cell to the macro cell. It is not necessary for the macro cell to understand the reconfiguration information through decoding, and at step 1430, the macro cell forwards the reconfiguration information to UE 1400 using the RRCConnectionReconfiguration message.

At step 1435, the UE transmits a response message to the RRC message. At is step 1440, the macro cell notifies the small cell that the reconfiguration of the small cell has been successfully performed using the SCG-ConfigAck message.

On the other hand, the small cell may send the reconfiguration information of the small cell without any request from the macro cell. Further, due to the reconfiguration of the small cell, the macro cell may perform a specific operation. For example, in the case of releasing the last SCell of the small cell, the macro cell requires path switch. Accordingly, it is necessary for the macro cell to grasp whether the received reconfiguration information is sent through a request from the macro cell or through generation by the small cell itself.

As described above, when the macro cell requests the reconfiguration information of the small cell, it is not necessary for the macro cell to understand the reconfiguration information through decoding. However, in the case of the reconfiguration that is sent by the small cell itself, it may be required for the macro cell to perform related operations through decoding. Accordingly, this embodiment proposes a method for discriminating between them.

As one possible method, a method for including one transaction identifier in the related message may be considered. The small cell makes the same transaction identifier included in the SCG-ConfigReq message and the SCG-Config message.

As another method, one-bit indicator may be included in the SCG-Config message instead of the transaction identifier. The indicator may be used to indicate to where the reconfiguration information is reconfiguration information through the request from the macro cell or reconfiguration information through the generation by the small cell itself.

<Embodiment 5>

The present invention to be described hereinafter relates to a method for is providing locations of Positioning Reference Signals (PRS) that are transmitted by neighboring cells when UE that performs Observed Time Difference Of Arrival (OTDOA) reports the locations of the PRS signals to a serving cell.

Figure 15:
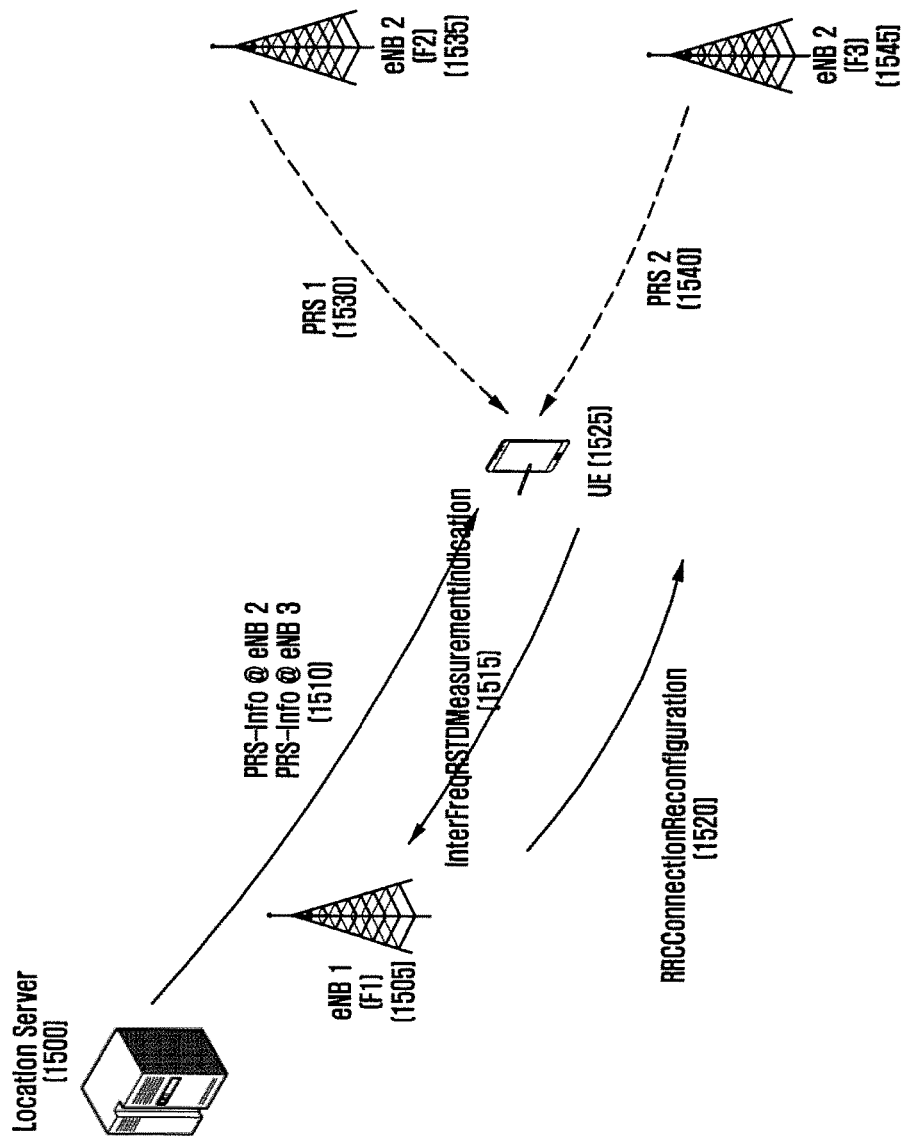
FIG. 15 is a diagram explaining a process in which OTDOA grasps the location of UE.

FIG. 15 is a diagram explaining a process in which OTDOA grasps the location of UE.

The basic concept is that the UE receives the PRS signals from the neighboring base stations and grasps its own location using the signals. The neighboring base stations transmit the PRS signals in a determined pattern. Accordingly, in order to receive the PRS signals, it is required for the UE to know a frequency with which the PRS signals are transmitted and PRS signal pattern information.

A location server 1500 on a network provides IDs of the neighboring base stations that transmit the PRS signals to the UE 1525, the frequency with which the PRS signals are transmitted, and the PRS pattern information to the UE 1525 (1510). Since the information is transferred to the UE via the base station 1505, but transparently passes through the base station, the base station is unable to understand the RPS related information.

A serving base station uses frequency F1, and the neighboring base stations 1535 and 1545 that transmit the PRS signals use frequencies F2 and F3. Since the UE is currently tuned to the frequency F1 of the current serving base station, the UE should use a measurement gap to receive the PRS signals 1530 and 1540 that are transmitted to by the neighboring base stations. The measurement gap is for the UE to interrupt transmission and reception operations in a serving frequency for a specific time period so as to measure other frequencies, and the serving base station sets the time period.

However, if the set measurement gap does not coincide with the pattern of the PRS signals transmitted by the neighboring base stations, the UE is unable to successfully receive the PRS signals.

Accordingly, the UE reports inter-freq measurement gap information that is necessary to receive the PRS signals based on the PRS related information that is provided from the location server to the serving base station 1505 using an IntgerFreqRSTD (Reference Signal Time Difference) MeasurementIndication message (1515). The serving base station that has received the information may set a proper measurement gap in order to successfully receive the PRS signals (1520).

Figure 16:
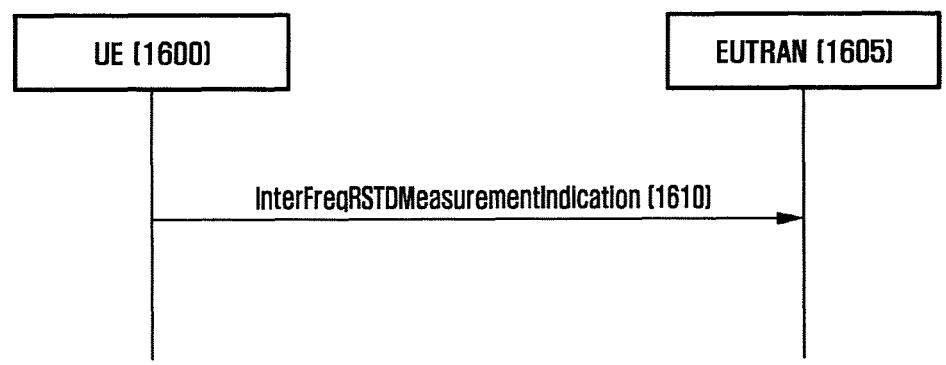
FIG. 16 is a diagram explaining a signaling flow in which UE reports inter-freq measurement gap information that is necessary to receive PRS signals to a base station.

FIG. 16 is a diagram a signaling flow in which UE reports inter-freq measurement gap information that is necessary to receive PRS signals to a base station.

UE 1600 reports an InterFreqRSTDMeasurementIndication message to a base station 1605. The InterFreqRSTD-MeasurementIndication message includes a frequency with which the PRS signals are transmitted and Inter-freq measurement gap pattern information.

In the present invention, the location of the Inter-freq measurement gap pattern that is necessary in a specific frequency is configured on the basis of SFN of PCell and a subframe. The PCell is called a specific cell that is defined in 3GPP LTE standard document, and performs establishment, reestablishment, and handover. The detailed definition is as described in Table 4 below.

TABLE 9

Primary Cell: The cell, operating on the primary frequency, in which the UE either performs the initial connection establishment procedure or initiates the connection re-establishment procedure, or the cell indicated as the primary cell in the handover procedure.

The UE reports the frequency with which one or more PRS signals are transmitted and the location of the Inter-freq measurement gap pattern.

That is, carrierFreq IE includes frequency information, and measPRS-Offset IE includes the location of the Inter-freq measurement gap pattern in the frequency.

According to the present invention, the location of the pattern is not indicated as a subframe in the frequency with which the PRS signals are transmitted, but is indicated as a subframe of PCell. The meaPRS-Offset IE has an integer value in the range of 0 to 39, and the integer value coincides with an index value of the subframe that starts from SFN=0 of the PCell.

The SFN is an index value that indicates a radio frame, and has a value in the range of 0 to 1023. Each radio frame is composed of 10 subframes (index 0~9). That is, if the integer value is 5, it indicates that the Inter-freq measurement gap starts at the sixth subframe (=subframe #5) of the radio frame in which SFN of PCell=0. During the gap, the UE obtains the PRS signals through measurement of other frequencies with which the PRS signals are transmitted.

The pattern is repeated for 4 radio frames (40 subframes).

The detailed rule for the InterFreqRSTDMeasurementIndication message may be explained with reference to Table 10 and Table 11 below.

TABLE 10

```
- InterFreqRSTDMeasurementIndication
  The InterFreqRSTDMeasurementIndication message is used to indicate that
the UE is going to either start or stop OTDOA inter-frequency RSTD measurement
which requires measurement gaps as specified in TS 36.133 [16, 8.1.2.6].
    Signalling radio bearer: SRB1
    RLC-SAP: AM
    Logical channel: DCCH
    Direction: UE to E_UTRAN
              InterFreqRSTDMeasurementIndication message
-- ASN1START
InterFreqRSTDMeasurementIndication-r10 ::=        SEQUENCE {
    criticalExtensions            CHOICE {
        c1                        CHOICE {
            interFreqRSTDMeasurementIndication-r10
            InterFreqRSTDMeasurementIndication-r10-IEs,
                spare3 NULL, spare2 NULL, spare1 NULL
        },
        criticalExtensionsFuture       SEQUENCE { }
    }
}
InterFreqRSTDMeasurementIndication-r10-IEs ::=    SEQUENCE {
    rstd-InterFreqIndication-r10      CHOICE {
        start            SEQUENCE {
            rstd-InterFreqInfoList-r10           RSTD-InterFreqInfoList-r10
        },
        stop             NULL
    },
    lateNonCriticalExtension     OCTET STRING                OPTIONAL,
    nonCriticalExtension         SEQUENCE { }                OPTIONAL
}
```

TABLE 11

```
RSTD-InterFreqInfoList-r10 ::= SEQUENCE [SIZE[1..maxRSTD-Freq-r10]] OF
RSTD-InterFreqInfo-r10
RSTD-InterFreqInfo-r10 ::=     SEQUENCE {
    carrierFreq-r10            ARFCN-ValueEUTRA,
    measPRS-Offset-r10         INTEGER [0..39],
    ...,
[[ carrierFreq-v1090           ARFCN-ValueEUTRA-v9e0           OPTIONAL
    ]]
}
-- ASN1STOP
          InterFreqRSTDMeasurementIndication field description[필드 설명 ]
  ■ carrierFreq
The EARFCN value of the carrier received from upper layers for which the UE needs
to perform the inter-frequency RSTD measurements. If the UE includes
carrierFreq-v1090, It shall set carrierFreq-r10 to maxEARFCN.
  ■ measPRS-Offset
Indicates the requested gap offset for performing inter-frequency RSTD
measurements. It is the smallest subframe offset from the beginning of subframe 0
of SFN=0 of the PCell of the requested gap for measuring PRS positioning
occasions in the carrier frequency carrierFreq for which the UE needs to perform
```

TABLE 11-continued the inter-frequency RSTD measurements. The PRS positioning occasion information
is received from upper layers. The value of measPRS-Offset is obtained by mapping
the starting subframe of the PRS positioning occasion in the measured cell onto
the corresponding subframe in PCell and is calculated as the PCell's number of
subframes from SFN=0 mod 40.
The UE shall take into account any additional time required by the UE to start PRS
measurements on the other carrier when it does this mapping for determining the
measPRS-Offset.
NOTE: Figure 6.2.2-1 illustrates the measPRS-Offset field.
■ rstd-InterFreqIndication
Indicates the inter-frequency RSTD measurement action, i.e. the UE is going to start
or stop inter-frequency RSTO measurement.

Figure 17:
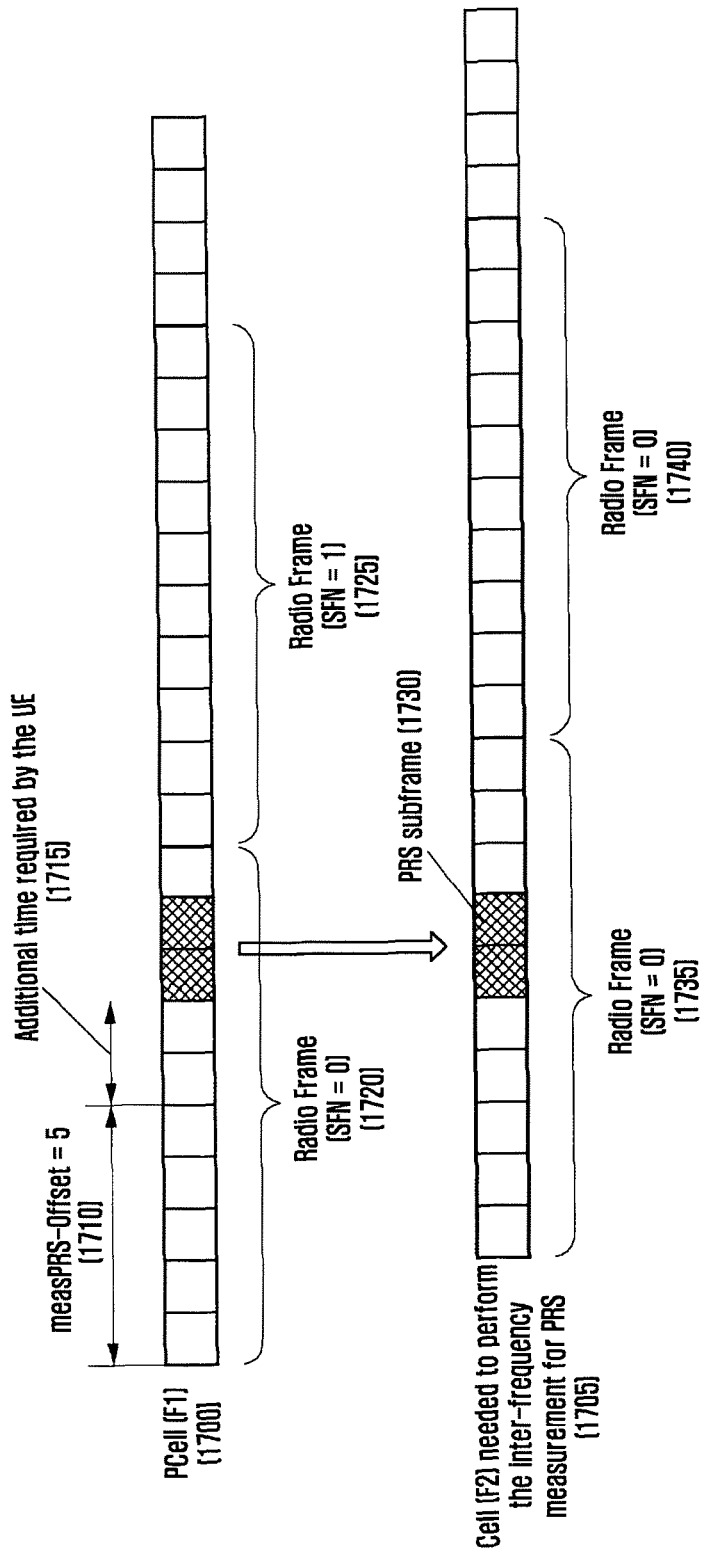
FIG. 17 is a diagram explaining a method for instructing the location of a subframe in which an inter-freq measurement gap starts in a specific frequency.

FIG. 17 is a diagram explaining a method for instructing the location of a subframe in which an inter-freq measurement gap starts in a specific frequency.

If UE indicates "5" as a measPRS-Offset IE value, the Inter-freq measurement gap starts at the sixth subframe that starts from SFN of PCell 1700=0 (1720). The UE requires a predetermined preparation time to monitor other frequencies (1715). Accordingly, the measPRS-Offset value should be decided in consideration of the preparation time and a location 1730 of a subframe of another frequency with which the PRS signals are transmitted.

During the gap, the UE measures the PRS signals 1730 at the other frequency F2. Since the location of the gap is indicated on the basis of the SFN of PCell and the subframe, the corresponding SFN and subframe in the other frequency may be different from those of the PCell (1735). The pattern may be repeated for 4 radio frames.

The UE may have a plurality of serving cells. For example, the UE may do so in the case of Carrier Aggregation and dual connectivity. For reference, PCell is one of the is serving cells.

It is assumed that all serving cells have the same SFN and subframe in the Carrier Aggregation. Accordingly, in the case of the Carrier Aggregation, the definition may be extended to the serving cell other than PCell.

In the case of dual connectivity, the respective serving cells may have different SFNs and subframes. Accordingly, it is necessary to define which cell is accurately indicated. As described above, the gap may be defined on the basis of the SFN of PCell and subframe. Further, the gap may be defined on the basis of the SFN of a serving cell that belongs to a Master Cell Group (MCG) and the subframe. In this case, the field description may be corrected as described in Table 12 below.

TABLE 12

InterFreqRSTDMeasurementIndication field descriptions carrierFreq
The EARFCN value of the carrier received from upper layers for which the UE needs
to perform the inter-frequency RSTD measurements. If the UE includes
carrierFreq-v1090, it shall set carrierFreq-r10 to maxEARFCN.
measPRS-Offset
Indicates the requested gap offset for performing inter-frequency RSTD
measurements. It is the smallest subframe offset from the beginning of subframe 0
of SFN = 0 of the serving cell belonging to MCG of the requested gap for measuring
PRS positioning occasions in the carrier frequency carrierFreq for which the UE
needs to perform the inter-frequency RSTD measurements. The PRS positioning
occasion information is received from upper layers. The value of measPRS-Offset is
obtained by mapping the starting subframe of the PRS positioning occasion in the
measured cell onto the corresponding subframe in the serving cell belonging to
MCG and is calculated as the the serving cell belonging to MCG's number of
subframes from SFN = 0 mod 40.
The UE shall take into account any additional time required by the UE to start PRS
measurements on the other carrier when it does this mapping for determining the
measPRS-Offset.
rstd-InterFreqIndication
Indicates the inter-frequency RSTD measurement action, i.e. the UE is going to start
or stop inter-frequency RSTD measurement.

NOTE:
FIG. 6.2.2-1 illustrates the measPRS-Offset field.

Meanwhile, preferred embodiments of the present invention disclosed in this specification and drawings and specific terms used therein are illustrated to present only specific examples in order to clarify the technical contents of the present invention and help understanding of the present invention, but are not intended to limit the scope of the present invention. It will be evident to those skilled in the art that various implementations based on the technical spirit of the present invention are possible in addition to the disclosed embodiments.

This invention claimed is:

1. A method by a second base station in a wireless communication system where a terminal communicated on one or more cells associated with a first base station and one or more cells associated with the second base station, the method comprising: receiving, from the first base station a first message to request a modification of configuration for the first base station; transmitting, to the first base station, a second message including configuration information for at least one cell of the second base station and capability information for the terminal in response to the first message; receiving, from the first base station, a third message including information of a reconfiguration for at least one cell of the first base station, wherein the information of the reconfiguration is generated by the first base station as a function of the configuration information and the capability information; and transmitting, to the terminal, a fourth message including the information of the reconfiguration.

2. The method claim 1, wherein the third message includes a radio resource control (RRC) message.

3. The method of claim 1, wherein the configuration information includes at least one of physical downlink shared channel (PDSCH) configuration information, physical uplink shared channel (PUSCH) configuration information, uplink power control configuration information, sounding reference signal configuration information, antenna information, or spectrum emission information of the second base station.

4. The method of claim 1, wherein the capability information includes band combination information indicating a supported carrier aggregation band combination.

5. A second base station in a wireless communication system where a terminal communicates on one or more cells associated with a first base station and one or more cells associated with the second base station, the second base station comprising: a transceiver configured to transmit and receive a signal; and a controller configured to: receive, via the transceiver, from the first base station, a first message to request a modification of configuration for the first base station; transmit, via the transceiver, to the first base station, a second message including configuration information for at least one cell of the second base station and capability information for the terminal in response to the first message, receive, via the transceiver, from the first base station, a third message including information of a reconfiguration for at least one cell of the first base station, wherein the information of the reconfiguration is generated by the first base station as a function of the configuration information and the capability information; and transmit, via the transceiver, to the terminal a fourth message including the information of the reconfiguration.

6. The second base station of claim 5, wherein the third message includes a radio resource control (RRC) message.

7. The second base station of claim 5, wherein the configuration information includes at least one of physical downlink shared channel (PDSCH) configuration information, physical uplink shared channel (PUSCH) configuration information, uplink power control configuration information, sounding reference signal (SRS) configuration information, antenna information, or spectrum emission information of the second base station.

8. The second base station of claim 5, wherein the capability information includes band combination information indicating a supported carrier aggregation band combination.

9. A method by a terminal in a wireless communication system where the terminal communicates on one or more cells associated with a first base station and one or more cells associated with a second base station, the method comprising:
receiving a first message including information of a reconfiguration from the second base station;
applying the information of the reconfiguration; and
transmitting a second message indicating that a reconfiguration is completed to the second base station,
wherein the information of the reconfiguration is generated by the first base station as a function of configuration information for at least one cell of the second base station and capability information for the terminal transmitted from the second base station to the first base station, when a third message to request a modification of configuration for the first base station is received from the first base station by the second base station.

10. The method of claim 9, wherein the configuration information of the at least one cell of the second base station includes at least one of physical downlink shared channel (PDSCH) configuration information, physical uplink shared channel (PUSCH) configuration information, uplink power control configuration information, sounding reference signal (SRS) configuration information, antenna information, or spectrum emission information of the second base station, and
wherein the capability information includes band combination information indicating a supported carrier aggregation band combination.

11. The method of claim 9, the method further comprising performing a random access procedure with the first base station.

12. A terminal in a wireless communication system where the terminal communicates on one or more cells associated with a first base station and one or more cells associated with a second base station, the terminal comprising:
a transceiver configured to transmit and receive a signal; and
a controller configured to:
receive, via the transceiver, from the second base station a first message including information of a reconfiguration;
apply the information of the reconfiguration; and
transmit, via the transceiver, to the second base station a second message indicating that the reconfiguration is completed,
wherein the information of the reconfiguration is generated by the first base station as a function of configuration information for at least one cell of the second base station and capability information for the terminal transmitted from the second base station to the first base station, when a third message to request a modification of configuration for the first base station is received from the first base station by the second base station.

13. The terminal of claim 12, wherein the configuration information of the at least one cell of the second base station includes at least one of physical downlink shared channel (PDSCH) configuration information, physical uplink shared channel (PUSCH) configuration information, uplink power control configuration information, sounding reference signal (SRS) configuration information, antenna information, or spectrum emission information of the second base station, and
wherein the capability information includes band combination information indicating a supported carrier aggregation band combination.

14. The terminal of claim 12, wherein the controller is configured to perform a random access procedure with the first base station.

* * * * *